US012615651B2

(12) United States Patent
Shimizu et al.

(10) Patent No.: US 12,615,651 B2
(45) Date of Patent: Apr. 28, 2026

(54) APPARATUSES AND METHODS FOR RESOURCE SELECTION IN SIDELINK COMMUNICATIONS

(71) Applicant: TOYOTA JIDOSHA KABUSHIKI KAISHA, Toyota (JP)

(72) Inventors: Takayuki Shimizu, Mountain View, CA (US); Kai-Erik Sunell, Naantali (FI); Claude Arzelier, Varna (BG); John Kenney, Mountain View, CA (US); Hongsheng Lu, Mountain View, CA (US); Onur Altintas, Mountain View, CA (US); Daniel Medina, Munich (DE); Nuno Kiilerich Pratas, Gistrup (DK); Faranaz Sabouri-Sichani, Aalborg Oe (DK); Thomas Jacobsen, Noerresundby (DK)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/048,915

(22) Filed: Feb. 8, 2025

(65) Prior Publication Data

US 2025/0185047 A1 Jun. 5, 2025

Related U.S. Application Data

(63) Continuation of application No. PCT/JP2023/026404, filed on Jul. 19, 2023.
(Continued)

(51) Int. Cl.
H04W 72/40 (2023.01)
H04W 72/542 (2023.01)
H04W 74/0808 (2024.01)

(52) U.S. Cl.
CPC ......... H04W 72/40 (2023.01); H04W 72/542 (2023.01); H04W 74/0808 (2013.01)

(58) Field of Classification Search
CPC .............. H04W 72/40; H04W 72/542; H04W 74/0808
See application file for complete search history.

(56) References Cited

U.S. PATENT DOCUMENTS

| | | | |
|---|---|---|---|
| 2022/0030575 A1 | 1/2022 | Farag | |
| 2022/0086803 A1* | 3/2022 | Li | H04W 72/0446 |

(Continued)

FOREIGN PATENT DOCUMENTS

| | | |
|---|---|---|
| EP | 4280728 A1 | 11/2023 |
| WO | WO 2022/045718 A1 | 3/2022 |

(Continued)

OTHER PUBLICATIONS

"FL Summary for AL 9.4.2—Co-Channel Coexistence for LTE and NR Sidelink," 3GPP TSG RAN WG1 #109-e, R1-2205588, dated May 24, 2022, 21 pages.
(Continued)

*Primary Examiner* — Rhonda L Murphy
(74) *Attorney, Agent, or Firm* — Finnegan, Henderson, Farabow, Garrett, and Dunner, LLP

(57) ABSTRACT

Disclosed are methods, apparatuses, and systems for resource selection in sidelink communications. The method includes: collecting at least one of sidelink sensing information or resource reservation information of a first sidelink communication; collecting at least one of sidelink sensing information or resource reservation information of a second sidelink communication; determining one or more candidate resources based on at least one of: the sidelink sensing information of the first sidelink communication, the resource reservation information of the first sidelink communication, the sidelink sensing information of the second sidelink
(Continued)

100 communication, or the resource reservation information of the second sidelink communication; selecting one or more resources among the one or more candidate resources; determining whether a resource reselection is needed; and transmitting, using the one or more selected resources, one or more packets in response to a determination that the resource reselection is not needed.

19 Claims, 18 Drawing Sheets

Related U.S. Application Data

(60) Provisional application No. 63/371,044, filed on Aug. 10, 2022.

(56) References Cited

U.S. PATENT DOCUMENTS

| | | | |
|---|---|---|---|
| 2023/0300799 A1 | 9/2023 | Lee | |
| 2024/0276463 A1* | 8/2024 | Hwang | H04W 72/25 |

FOREIGN PATENT DOCUMENTS

| | | |
|---|---|---|
| WO | WO 2022/153547 A1 | 7/2022 |
| WO | WO 2023/203658 A1 | 10/2023 |

OTHER PUBLICATIONS

"Co-channel coexistence for LTE sidelink and NR sidelink," 3GPP TSG RAN WG1 #109-e R1-2203563, dated Apr. 29, 2022, 6 pages.
"Discussions on co-channel coexistence of LTE-SL and NR-SL," 3GPP TSG RAN WG1 #109-e R1-2204384, dated Apr. 29, 2022, 5 pages.

* cited by examiner

100

300

| SCS | $T^{SL}_{proc,0}$ | $T^{SL}_{proc,1}$ |
|-----|-------------------|-------------------|
| 15 kHz | 1 slot = 1 ms | 3 slots = 3 ms |
| 30 kHz | 1 slot = 0.5 ms | 5 slots = 2.5 ms |
| 60 kHz | 2 slots = 0.5 ms | 9 slots = 2.25 ms |
| 120 kHz | 4 slots = 0.5 ms | 17 slots = 2.125 ms |

FIG. 4B

Second SL

Type C

First SL

Type B

Second SL    First SL

Type A

APPARATUSES AND METHODS FOR RESOURCE SELECTION IN SIDELINK COMMUNICATIONS

CROSS-REFERENCE TO RELATED PATENT APPLICATION

This application is a continuation of International Patent Application No. PCT/JP2023/026404 filed on Jul. 19, 2023, which claims the benefit of priority of U.S. Provisional Application No. 63/371,044, filed on Aug. 10, 2022, entitled "5G NR-V2X PC5 MODE 2 RESOURCE EXCLUSION FOR CO-CHANNEL COEXISTENCE WITH LTE-V2X IN MIXED SUB-CARRIER SPACING SCENARIOS," the entirety of both of which are is incorporated by reference herein.

FIELD

Apparatuses and methods consistent with the present disclosure relate generally to communications, more specifically, methods, systems, and devices for resource selection or reselection in sidelink communications.

BACKGROUND

Sidelink communication technology enables direct communication between two devices. When a user equipment (UE) in a sidelink communication shares radio resources with another UE in another sidelink communication, the UE selects or reselects proper radio resources for use. When the two sidelink communications have different particulars (e.g., using different sub-carrier spacings), the selection or reselection of radio resources could be complicated and there can be issues (e.g., an automatic gain control issue) that significantly degrades the UE performance. Improved systems and methods for selecting or reselecting radio resources are desired.

The resource selection procedure of 3rd Generation Partnership Project (3GPP) Release 16/17 5G New Radio (NR) vehicle-to-everything (V2X) PC5 mode 2 is specified in 3GPP Technical Specification (TS) 38.213, TS 38.214, and TS 38.321. For resource selection, a UE performs channel sensing in a sensing window and collects another UE's resource reservation information based on sidelink control information (SCI) decoding to identify candidate resources in a selection window T ($T=[T_1, T_2]$). First, the UE excludes some time slots from the selection window due to unmonitored resources in the sensing window that the UE cannot sense due to its own transmission (i.e., half-duplex constraint). Then, the UE further excludes resources reserved by other UEs from the selection window if the corresponding sidelink-reference signal received power (SL-RSRP) exceeds the (pre-) configured SL-RSRP exclusion threshold. After resource exclusion, the number of candidate resources shall be at least X % of the total number of resources in the selection window. Otherwise, UE increases SL-RSRP exclusion threshold by 3 dB until obtaining at least X % resources, where X is (pre-) configured from {20, 35, 50} %. Finally, the UE randomly selects resources among candidate resources in the selection window. The selected frequency resource can be used for multiple times with a fixed time interval for subsequent transmissions (i.e., semi-persistent scheduling (SPS)) or only once (i.e., one-shot transmission (OST)). Also, the UE can retransmit packets multiple times (i.e., hybrid automatic repeat request (HARQ) retransmissions) with or without feedback from receiver UEs to improve the reliability.

In order for a UE to perform sensing and obtain information to receive other UEs' packets, the UE decodes SCI first. In Rel-16, there are $1^{st}$-stage SCI (SCI format 1-A) and $2^{nd}$-stage SCI (SCI format 2-A or 2-B) as defined in 3GPP TS 38.212. $1^{st}$-stage SCI carries resource reservation information for future transmissions, as well as information about resource allocation and modulation and coding scheme (MCS) for physical sidelink shared channel (PSSCH), demodulation reference signal (DMRS) pattern, $2^{nd}$-stage SCI format, etc. $2^{nd}$-stage SCI carries control information for HARQ procedures, source/destination IDs, information for distance-based groupcast (UE's zone identification (ID) and communication range requirement), etc. Based on the resource reservation contained in $1^{st}$-stage SCI, each UE avoids using reserved time/frequency resources by other UEs when it performs resource (re-)selection.

In Rel-17 5G NR-V2X PC5 mode 2, inter-UE coordination (IUC) is introduced, in which a UE-A sends coordination information about resources to a UE-B, and then the UE-B utilizes that information for its resource (re-)selection. The following schemes of inter-UE coordination are supported:

IUC scheme 1: A UE-A can provide to another UE-B indications of resources that are preferred to be included in UE-B's (re-)selected resources, or preferred to be excluded. When given resources to include, UE-B may rely only on those resources, at least if it does not support sensing/resource exclusion, or may combine them with resources identified by its own sensing procedure, before making a final selection. The indication from UE-A to UE-B is sent in medium access control (MAC) control element (CE) and/or $2^{nd}$-stage SCI.

IUC scheme 2: A UE-A can provide to another UE-B an indication that resources reserved for UE-B's transmission (which may or may not be to UE-A) will be, or could be, subject to conflict with a transmission from another UE. Then, UE-B re-selects new resources to replace them. The indication from UE-A to UE-B is sent in a physical sidelink feedback channel (PSFCH).

SUMMARY

According to some embodiments of the present disclosure, there is provided a method for resource selection and packet transmission in sidelink communications. The method includes collecting at least one of sidelink sensing information or resource reservation information of a first sidelink communication; collecting at least one of sidelink sensing information or resource reservation information of a second sidelink communication; determining one or more candidate resources based on at least one of: the sidelink sensing information of the first sidelink communication, the resource reservation information of the first sidelink communication, the sidelink sensing information of the second sidelink communication, or the resource reservation information of the second sidelink communication; selecting one or more resources among the one or more candidate resources; determining whether a resource reselection is needed; and transmitting, using the one or more selected resources, one or more packets in response to a determination that the resource reselection is not needed.

In some embodiments, the method for resource selection and packet transmission in sidelink communications enables dynamic co-channel coexistence of the first sidelink communication and the second sidelink communication, in which the first sidelink communication and the second sidelink communication use the same sub-carrier spacing or different sub-carrier spacings. For dynamic co-channel coexistence, in the method, a UE may perform resource selection and packet transmission in the first sidelink communication by taking into account at least one of sensing information or resource reservation information collected in the first sidelink communication and the second sidelink communication, instead of that of the first sidelink communication only.

According to some embodiments of the present disclosure, there is provided a UE. The UE includes a memory storing an instruction; and a processor configured to execute the instruction stored in the memory to: collect at least one of sidelink sensing information or resource reservation information of a first sidelink communication; collect at least one of sidelink sensing information or resource reservation information of a second sidelink communication; determine one or more candidate resources based on at least one of: the sidelink sensing information of the first sidelink communication, the resource reservation information of the first sidelink communication, the sidelink sensing information of the second sidelink communication, or the resource reservation information of the second sidelink communication; select one or more resources among the one or more candidate resources; determine whether a resource reselection is needed; and transmit a packet to a destination in response to a determination that the resource reselection is not needed.

According to some embodiments of the present disclosure, there is provided a non-transitory computer-readable medium storing instructions that are executable by one or more processors of a UE to perform a method. The method includes collecting at least one of sidelink sensing information or resource reservation information of a first sidelink communication; collecting at least one of sidelink sensing information or resource reservation information of a second sidelink communication; determining one or more candidate resources based on at least one of: the sidelink sensing information of the first sidelink communication, the resource reservation information of the first sidelink communication, the sidelink sensing information of the second sidelink communication, or the resource reservation information of the second sidelink communication; selecting one or more resources among the one or more candidate resources; determining whether a resource reselection is needed; and transmitting a packet to a destination in response to a determination that the resource reselection is not needed.

BRIEF DESCRIPTION OF DRAWINGS

FIG. 4B is a table showing a correspondence between sub-carrier spacing (SCS) and a subset of resources according to the method of FIG. 3, consistent with some embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of systems, apparatuses, and methods consistent with aspects related to the present disclosure as recited in the appended claims.

Figure 1:
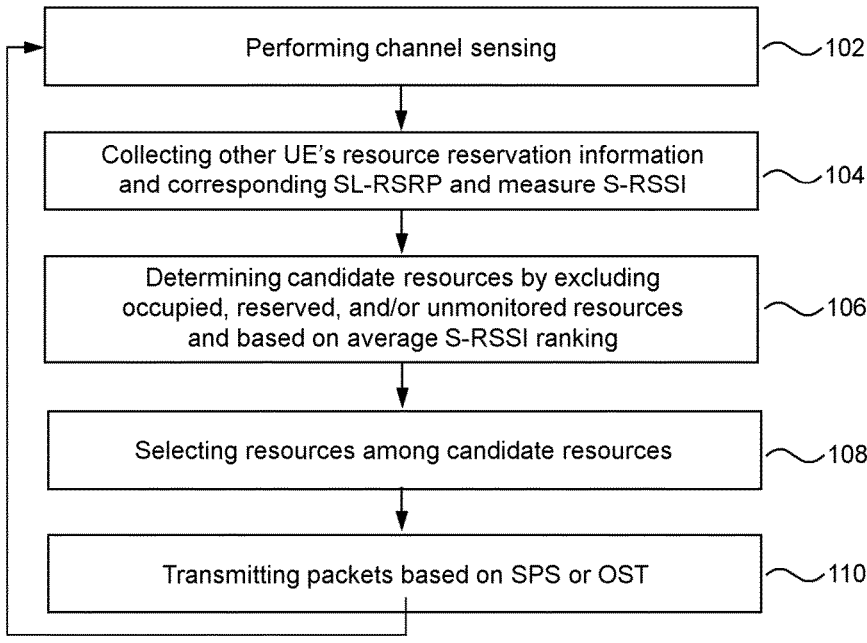
FIG. 1 is a flow chart illustrating a method for resource selection in a sidelink communication, consistent with some embodiments of the present disclosure.
Figure 2:
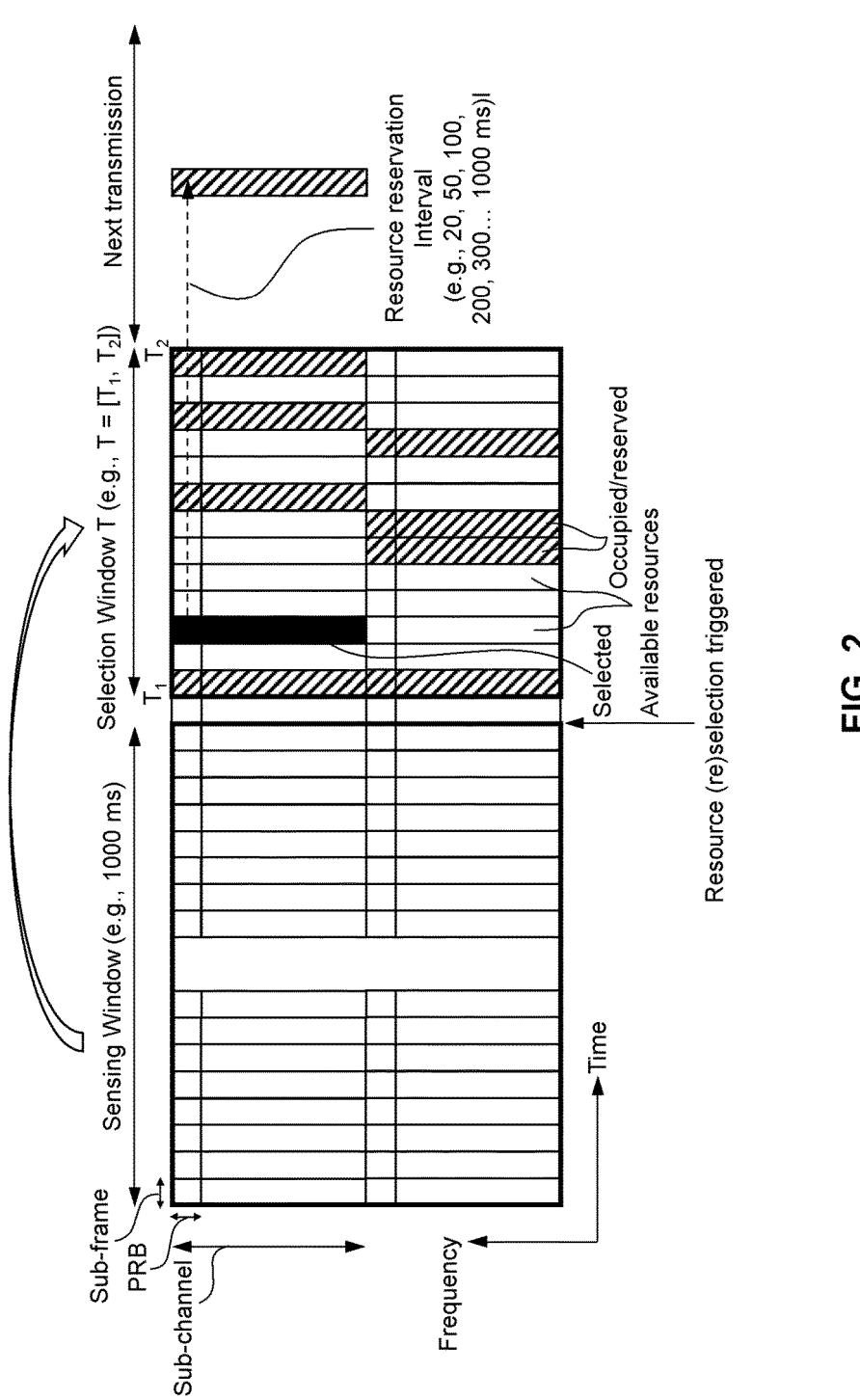
FIG. 2 is a schematic diagram illustrating a resource candidate determination procedure according to the method of FIG. 1, consistent with some embodiments of the present disclosure.

FIG. 1 is a flow chart illustrating a method 100 (referred to as the "first method" in this disclosure) for resource selection in a sidelink communication; and FIG. 2 is a schematic diagram illustrating a resource candidate determination procedure according to the first method, consistent with some embodiments of the present disclosure. The method 100 may be performed by a UE in a sidelink communication. For example, the method 100 may be performed by a vehicle in a V2X communication. The method 100 may be performed under a mode (referred to as the "first mode" in this disclosure) that employs discrete Fourier transform spread orthogonal frequency division multiplexing (DFT-s-OFDM) for sidelink at the physical (PHY) layer. An example of the first mode is the 3GPP Release 14/15 Long-Term Evolution (LTE) V2X PC5 mode 4.

As shown in FIG. 2, in the first mode, the time-frequency radio resources are divided into sub-frames in the time domain and sub-channels in the frequency domain. In an embodiment, the first mode may only support 15 kHz sub-carrier spacing. Each sub-frame may be 1 ms length and may consist of 14 DFT-s-OFDM symbols. Each sub-channel may consist of multiple contiguous physical resource blocks (PRBs), where each PRB occupies 180 KHz and consists of 12 subcarriers with 15 kHz SCS. The size of sub-channel (i.e., the number of PRBs per sub-channel) may be configurable or preconfigurable. To cope with high Doppler caused by high relative speed in vehicular scenarios, the density of demodulation reference signal (DMRS), which is used for frequency offset compensation and channel estimation, may be set to four per sub-frame. Each UE may broadcast data (e.g., transport block (TB)) in the physical sidelink shared channel (PSSCH) and sidelink control information (SCI) in the physical sidelink control channel (PSCCH). The PSCCH may occupy two contiguous PRBs. The number of PRBs for PSSCH may be configurable or preconfigurable. The SCI format may contain information to decode the corresponding TB in PSSCH and facilitate UE autonomous resource selection. As shown in FIG. 2, the resource reservation interval can be set to one of the allowed values (e.g., 20, 50, 100, 200, 300 . . . 1000 ms). PSCCH and the corresponding PSSCH may be transmitted in the same sub-frame in either adjacent or non-adjacent PRBs in the frequency domain.

Referring to FIG. 1, method 100 includes a step 102 of performing a channel sensing (e.g., background sensing or any other type of full sensing or partial sensing). For example, as shown in FIG. 2, for resource selection, a UE may perform channel sensing in a sensing window (e.g., 1000 ms) to collect another UE's resource reservation information. The sensing window can be any time duration, depending on the UE implementation.

Referring back to FIG. 1, the method 100 includes a step 104 of collecting another UE's resource reservation information and corresponding Sidelink Reference Signal Received Power (SL-RSRP), and measuring Sidelink Received Signal Strength Indicator (S-RSSI). For example, the UE may collect resource reservation information of other UEs and the corresponding SL-RSRPs. The UE may also measure the S-RSSI using received sidelink signals. The UE may decode received SCI included in the received sidelink signals to identify candidate resources in a selection window T (e.g., $T=[T_1, T_2]$, where $T_1 \le 4$ ms, and $20 \le T_2 \le 100$ ms), as shown in FIG. 2. The selection of the $T_1$ and $T_2$ values depends on the UE implementation.

The method 100 includes a step 106 of determining candidate resources by excluding occupied, reserved, and/or unmonitored resources and based on an average S-RSSI ranking. For example, as shown in FIG. 2, once the resource selection or reselection is triggered, the UE may exclude some sub-frames from the selection window. The excluded sub-frames may be the resources not monitored in the sensing window. The UE may not sense these resources due to, for example, its own transmission (e.g., half-duplex constraint). The UE may further exclude resources occupied or reserved by other UEs from the selection window if the corresponding SL-RSRP exceeds a configured or preconfigured SL-RSRP exclusion threshold. After resource exclusion, the number of candidate resources may be at least 20% of the total number of resources in the selection window. Otherwise, the UE may increase the SL-RSRP exclusion threshold by, for example, 3 dB until the candidate resources reaches at least 20% of the total resources. The UE may further calculate the corresponding S-RSSI of each sub-channel resource as a linear average over the S-RSSIs of the monitored resources with a certain interval (e.g., the averaging interval is 100 ms for a resource reservation interval of greater than or equal to 100 ms). The UE may determine, for example, 20% best resources in terms of lowest average S-RSSI as the candidate resources among the total resources in the selection window. The UE may use the 20% resources with the lowest average S-RSSI based on S-RSSI ranking as candidate resources.

The method 100 includes a step 108 of selecting resources among candidate resources. The selection of the resources among the candidate resources may be a random selection. For example, as shown in FIG. 2, the UE may select a single-subframe resource in a uniformly random manner among candidate single-subframe resources. The selected frequency resource can be used for multiple times with a fixed time interval for subsequent transmissions (this scheme is referred to as "semi-persistent scheduling (SPS)" in this disclosure) or only once (this scheme is referred to as "one-shot transmission (OST)" in this disclosure).

The method 100 includes a step 110 of transmitting the packets based on SPS or OST. The packets can be initial or retransmitted packets. For example, the UE may transmit an initial packet using the selected resources. For another example, the UE may retransmit a packet up to one time without feedback from receiver UEs to improve reliability of the transmission (this is referred to as "blind HARQ retransmission" in this disclosure). After the transmission, the method may start again from the step 102.

Figure 3:
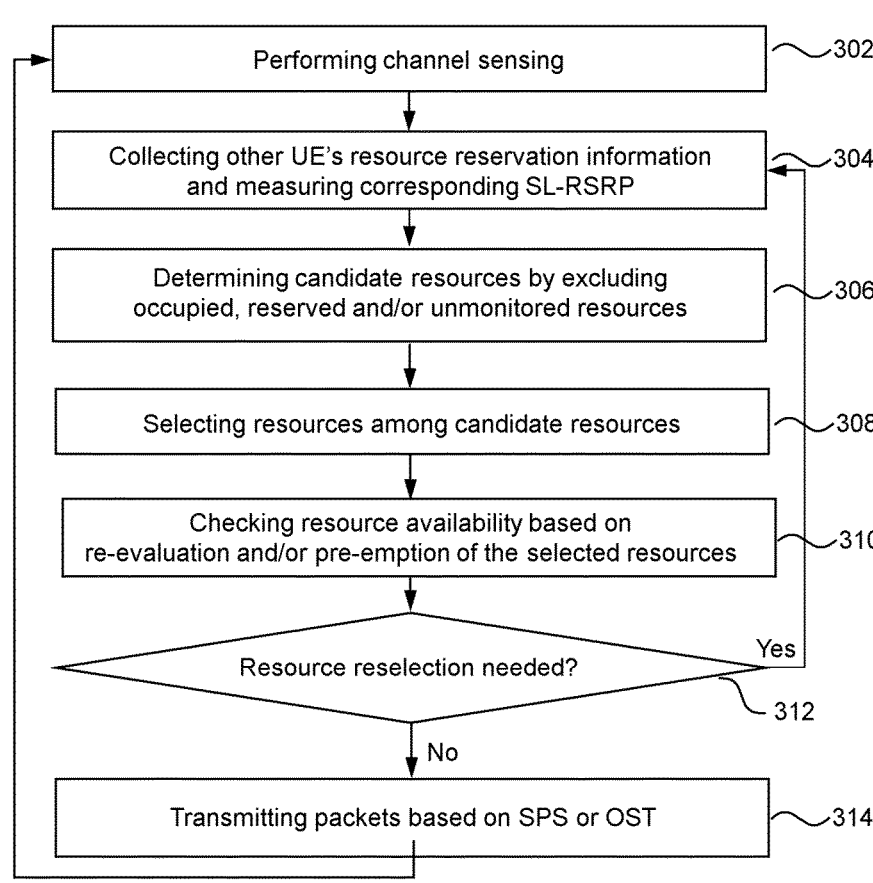
FIG. 3 is a flow chart illustrating a method for resource selection in a sidelink communication, consistent with some embodiments of the present disclosure.
Figure 4A:
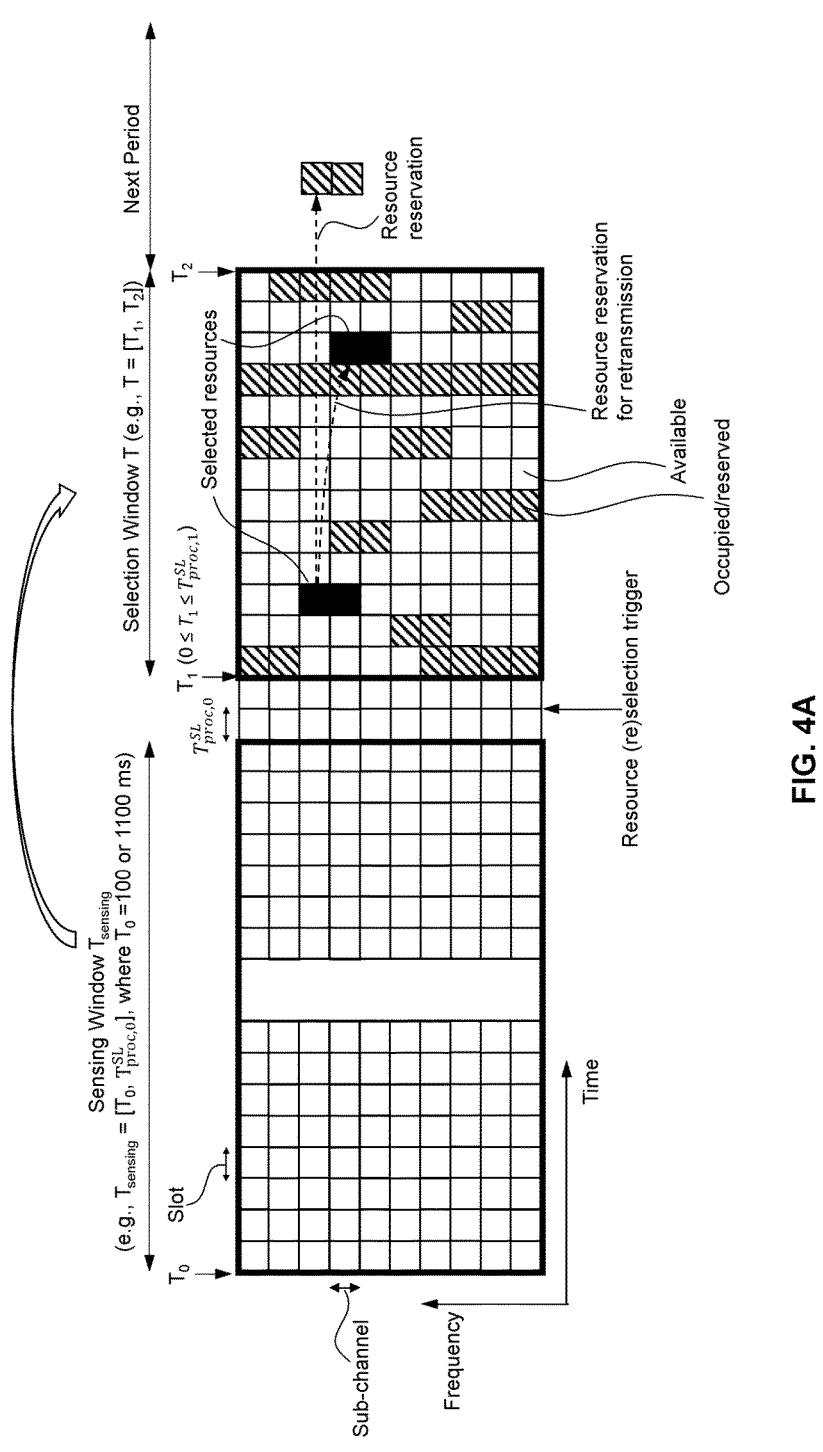
FIG. 4A is a schematic diagram illustrating a resource candidate determination procedure according to the method of FIG. 3, consistent with some embodiments of the present disclosure.

FIG. 3 is a flow chart illustrating a method 300 (referred to as the "second method" in this disclosure) for resource selection in a sidelink communication; FIG. 4A is a schematic diagram illustrating a resource candidate determination procedure according to the second method; and FIG. 4B is a table showing a correspondence between SCS and a subset of resources according to the second method, consistent with some embodiments of the present disclosure. The method 300 may be performed by a UE in a sidelink communication. For example, the method 300 may be performed by a vehicle in a V2X communication. The method 300 may be performed under a mode (referred to as the "second mode" in this disclosure) that employs orthogonal frequency division multiplexing (OFDM) at the PHY layer for sidelink communication. An example of the second mode is the 3GPP Release 16/17 5G NR-V2X PC5 mode 2.

As shown in FIG. 4A, in the second mode, the time-frequency radio resources are divided into slots in the time domain and sub-channels in the frequency domain. In an embodiment, the second mode may support SCSs of $15 \times 2^\mu$ kHz, where $\mu$ is the OFDM numerology $\mu \in \{0, 1, 2, 3, 4\}$. For sub-6 GHz frequency, SCSs of 15, 30, and 60 KHz (i.e., $\mu \in \{0, 1, 2\}$) may be supported, whereas for above 6 GHz frequency, SCSs of 60, 120, and 240 kHz (i.e., $\mu \in \{2, 3, 4\}$) may be supported. Each slot is $\frac{1}{2}^\mu$ ms length and consists of 14 OFDM symbols. Each sub-channel may consist of multiple contiguous PRBs, where each PRB occupies $180 \times 2^\mu$ KHz and consists of 12 subcarriers with $15 \times 2^\mu$ KHz SCS. The size of sub-channel (i.e., the number of PRBs per sub-channel) is configurable or preconfigurable. To support multiple SCSs and different Doppler spreads, multiple DMRS density options (2~4 DMRS symbols per slot) are supported. Each UE may transmit a first stage SCI in the PSCCH and data (TB) and a second stage SCI in the PSSCH. HARQ feedback (e.g., acknowledgement (ACK)/negative acknowledgement (NACK) or NACK only) may be transmitted in the physical sidelink feedback channel (PSFCH).

FIG. 4B shows the correspondence among SCS and parameters for the sensing window and selection window ($T^{SL}_{proc,0}$ and $T^{SL}_{proc,1}$), consistent with some embodiments of the present disclosure. For example, when the SCS is 15 kHz, as shown in the second and third columns of FIG. 4B, $T^{SL}_{proc,0}$ corresponds to 1 ms, and $T^{SL}_{proc,1}$ correspond to 3 ms. As another example, when the SCS is 30 KHz, $T^{SL}_{proc,0}$ corresponds to 0.5 ms, and $T^{SL}_{proc,1}$ correspond 2.5 ms.

Referring back to FIG. 3, the method 300 includes a step 302 of performing a channel sensing (e.g., background sensing or any other type of full sensing or partial sensing). For example, as shown in FIG. 4A, a UE may perform a background channel sensing in a sensing window $T_{sensing}$ (e.g., $T_{sensing}=[T_0, T^{SL}_{proc,0}]$, where $T_0=100$ or 1100 ms and $T^{SL}_{proc,0}$ is given in FIG. 4B) to collect another UE's resource reservation information. The background channel sensing with a sensing window of 100 ms may be for an aperiodic traffic, while the background channel sensing with a sensing window of 1100 ms may be for a periodic traffic.

The method 300 includes a step 304 of collecting another UE's resource reservation information and measuring corresponding SL-RSRPs. For example, as shown in FIG. 4A, the UE may perform channel sensing in the sensing window and collect another UE's resource reservation information based on SCI decoding to identify candidate resources. In an embodiment, in order to perform background sensing and obtain information to receive other UEs' packets, UE decodes SCI first. The SCI decoding may include two stages: a first stage SCI (SCI format 1-A) and a second stage SCI (SCI format 2-A or 2-B) as defined in 3GPP. The first stage SCI may carry resource reservation information for future transmissions, information about resource allocation, modulation and coding scheme (MCS) for PSSCH, DMRS pattern, and the second stage SCI format, etc. The second stage SCI may carry control information for HARQ procedures, source/destination IDs, information for distance-based groupcast (e.g., UE's zone ID and communication range requirement), etc. Based on the resource reservation contained in the first stage SCI, each UE can avoid using reserved time and/or frequency resources by other UEs when the UE performs resource selection or reselection.

The method 300 may support inter-UE coordination (IUC) in which a UE-A sends coordination information about resources to a UE-B, and the UE-B utilizes that information for its resource selection or reselection. The supported schemes of IUC may include a first IUC scheme. In the first IUC scheme, the UE-A can provide to the UE-B indications of resources that are preferred to be included in UE-B's (re-)selected resources, or preferred to be excluded. In an embodiment, when an indication of resources indicates inclusion of given resources, the UE-B may solely rely on those resources, if the indication does not support sensing and/or resource exclusion. In an embodiment, the UE-B may also combine the indication of resources with resources identified by its own sensing procedure before making a final selection. The indication from the UE-A to the UE-B may be sent in Medium Access Control (MAC) Control Element (CE) and/or 2nd-stage SCI. The supported schemes of IUC may also include a second IUC scheme. In the second IUC scheme, a UE-A can provide to a UE-B an indication that resources reserved for the UE-B's transmission (which may or may not be to the UE-A) will be, or could be, subject to conflict with a transmission from other UEs. In this case, the UE-B may re-select new resources. The indication from the UE-A to the UE-B may be sent in PSFCH.

The method 300 includes a step 306 of determining candidate resources by excluding occupied, reserved, and/or unmonitored resources. For example, the UE may exclude unmonitored slots from the selection window T (e.g., $T=[T_1, T_2]$, where $0 \leq T_1 \leq T^{SL}_{proc,1}$ ms, $T^{SL}_{proc,1}$ is given in FIG. 4B, and $T_2$ is set based on the remaining packet delay budget). The UE may fail to sense the unmonitored slots in the sensing window due to, for example, its own transmission (e.g., half-duplex constraint). The UE may further exclude resources occupied or reserved by other UEs from the selection window if the corresponding SL-RSRP exceeds a configured or preconfigured SL-RSRP exclusion threshold. After resource exclusion, the number of candidate resources may be at least X % of the total number of resources in the selection window. Otherwise, UE may increase the SL-RSRP exclusion threshold by, for example, 3 dB until at least X % resources are obtained, where X may be configured or preconfigured from {20, 35, 50} %.

The method 300 includes a step 308 of selecting resources among candidate resources. The selection may be a random selection. For example, as shown in FIG. 4A, the UE may randomly select resources among candidate resources in the selection window. The selected frequency resource can be used for multiple times with a fixed time interval for subsequent transmissions (SPS) or only once (OST).

The method 300 includes a step 310 of checking resource availability based on re-evaluation and/or pre-emption of the selected resources. This step may be performed for the late-arriving packets (e.g., aperiodic packets) after resource selection and before the packet transmission.

The method 300 includes a step 312 of determining whether a resource reselection is needed. If it is determined that a resource reselection is needed, the method may iterate from the step 304. On the other hand, if it is determined that a resource reselection is not needed, the method may proceed with a step 314 of transmitting packets based on SPS or OST. The packets may be initial packets or retransmitted packets. The UE may also retransmit packets multiple times (e.g., HARQ retransmissions) with or without feedback from receiver UEs to improve reliability of the transmission.

Some embodiments of the present disclosure are directed to resource selection or reselection for co-channel coexistence of two or more sidelink communications (e.g., the sidelink communication described in relation to FIGS. 1-2 and the sidelink communication described in relations to FIG. 3-4B) in mixed SCS scenarios. For example, one or more embodiments of the present disclosure are directed to 3GPP 5G NR-V2X PC5 mode 2 resource selection for co-channel coexistence with 3GPP LTE-V2X PC5 mode 4 in mixed SCS scenarios. For example, the LTE sidelink communication uses 15 kHz SCS, while the NR sidelink communication uses a higher SCS (e.g., 30, 60 kHz). As discussed below in relation to FIGS. 7A-7B, such mixed SCS scenarios result in an automatic gain control (AGC) issue. At least some embodiments of the present disclosure address the AGC issue that exists in co-channel coexistence between two sidelink communications (e.g., 3GPP Release 14/15 LTE sidelink and 3GPP Release 18 NR sidelink) in mixed SCS scenarios, and provide solutions for mitigating the AGC issues due to mixed SCS. The methods described in this disclosure can be applied to any sidelink communications, for example, a future generation (6$^{th}$ generation (6G), 7$^{th}$ generation (7G), or any future generation) sidelink communications.

Figure 5:
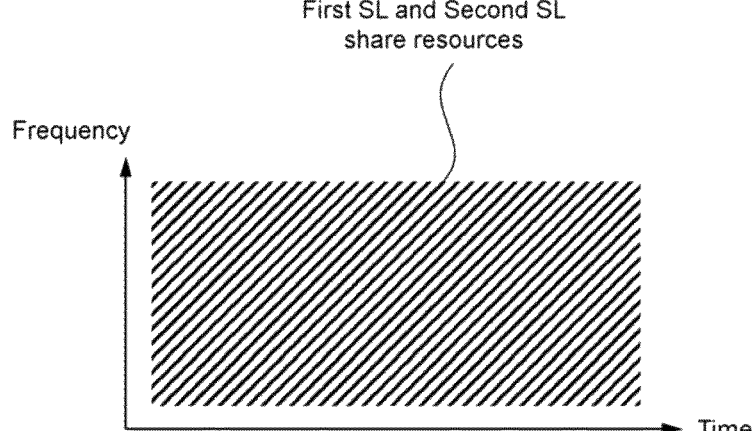
FIG. 5 is a schematic diagram illustrating dynamic co-channel coexistence of a first sidelink communication and a second sidelink communication, consistent with some embodiments of the present disclosure.

FIG. 5 is a schematic diagram illustrating dynamic co-channel coexistence of a first sidelink (SL) communication and a second sidelink (SL) communication, consistent with some embodiments of the present disclosure. In an embodiment, the first sidelink communication is NR sidelink communication and the second sidelink communication is LTE sidelink communication. In this embodiment, for example, the LTE sidelink communication uses 15 kHz SCS, while the NR sidelink communication uses a higher SCS (e.g., 30, 60 kHz). As shown in FIG. 5, the first sidelink communication and the second sidelink communication share time and/or frequency resources.

Figure 6:
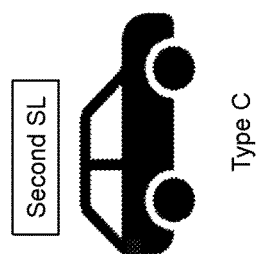
FIG. 6 is a schematic diagram illustrating device types for dynamic co-channel coexistence of a first sidelink communication and a second sidelink communication, consistent with some embodiments of the present disclosure.
Figure 6:
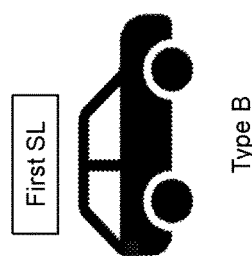
Figure 6:
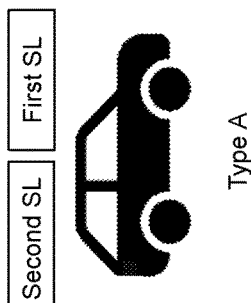

FIG. 6 is a schematic diagram illustrating device types for dynamic co-channel coexistence of a first sidelink (SL) communication and a second sidelink (SL) communication, consistent with some embodiments of the present disclosure. Referring to FIG. 6, at least three types (Type A, Type B, and Type C) of devices are considered in this disclosure. A Type A device includes a module for the first sidelink communication and a module for the second sidelink communication. A Type B device only includes a module for the first sidelink communication. A Type C device only include a module for the second sidelink communication. For example, in an embodiment, a Type A device includes both LTE SL and NR SL modules; a Type B device only includes an NR SL module; and a Type C device only includes an LTE SL module.

Figure 7A:
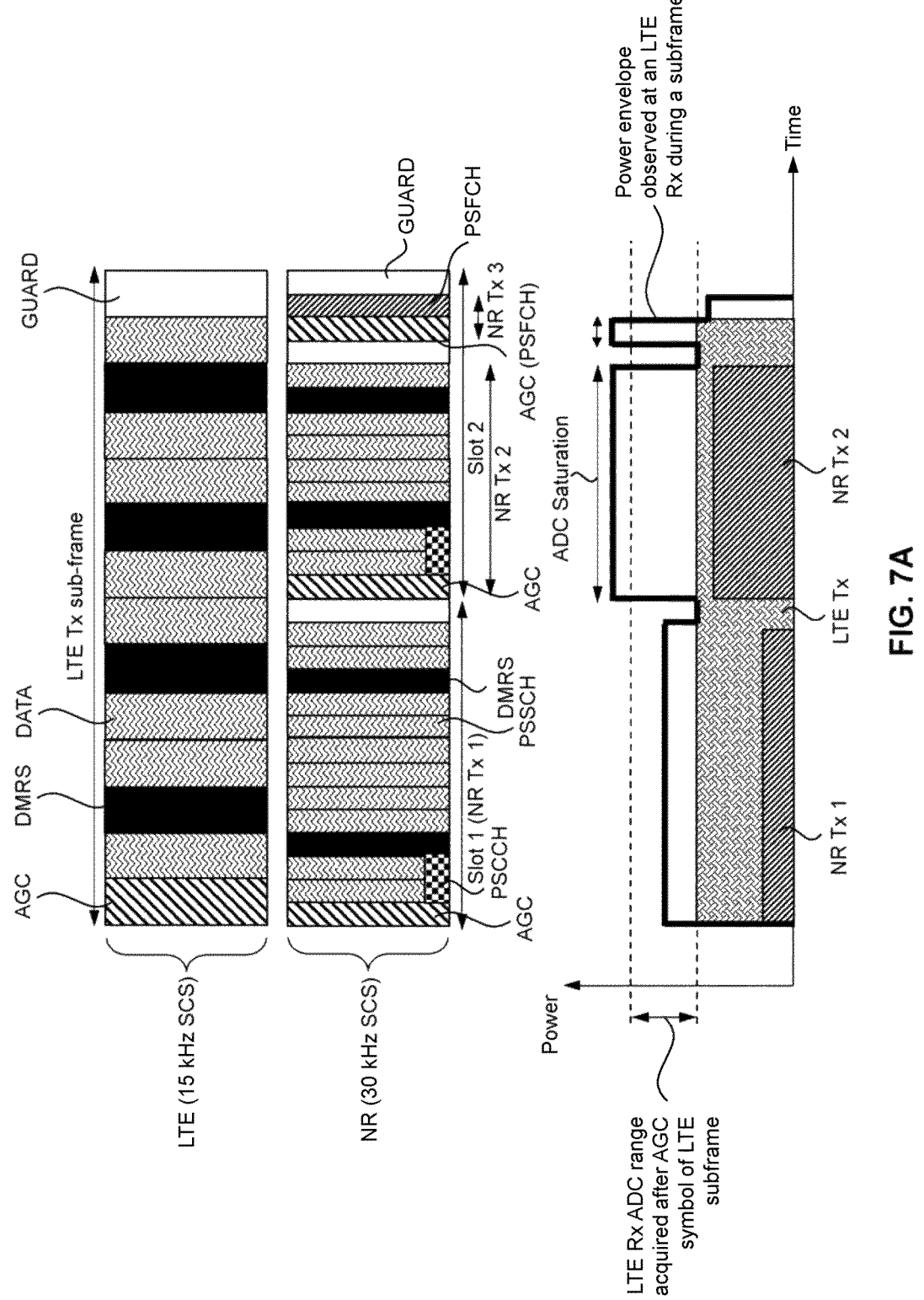
FIG. 7A is a schematic diagram illustrating an exemplary automatic gain control (AGC) issue occurring in a dynamic co-channel coexistence between NR sidelink and LTE sidelink, consistent with some embodiments of the present disclosure.
Figure 7B:
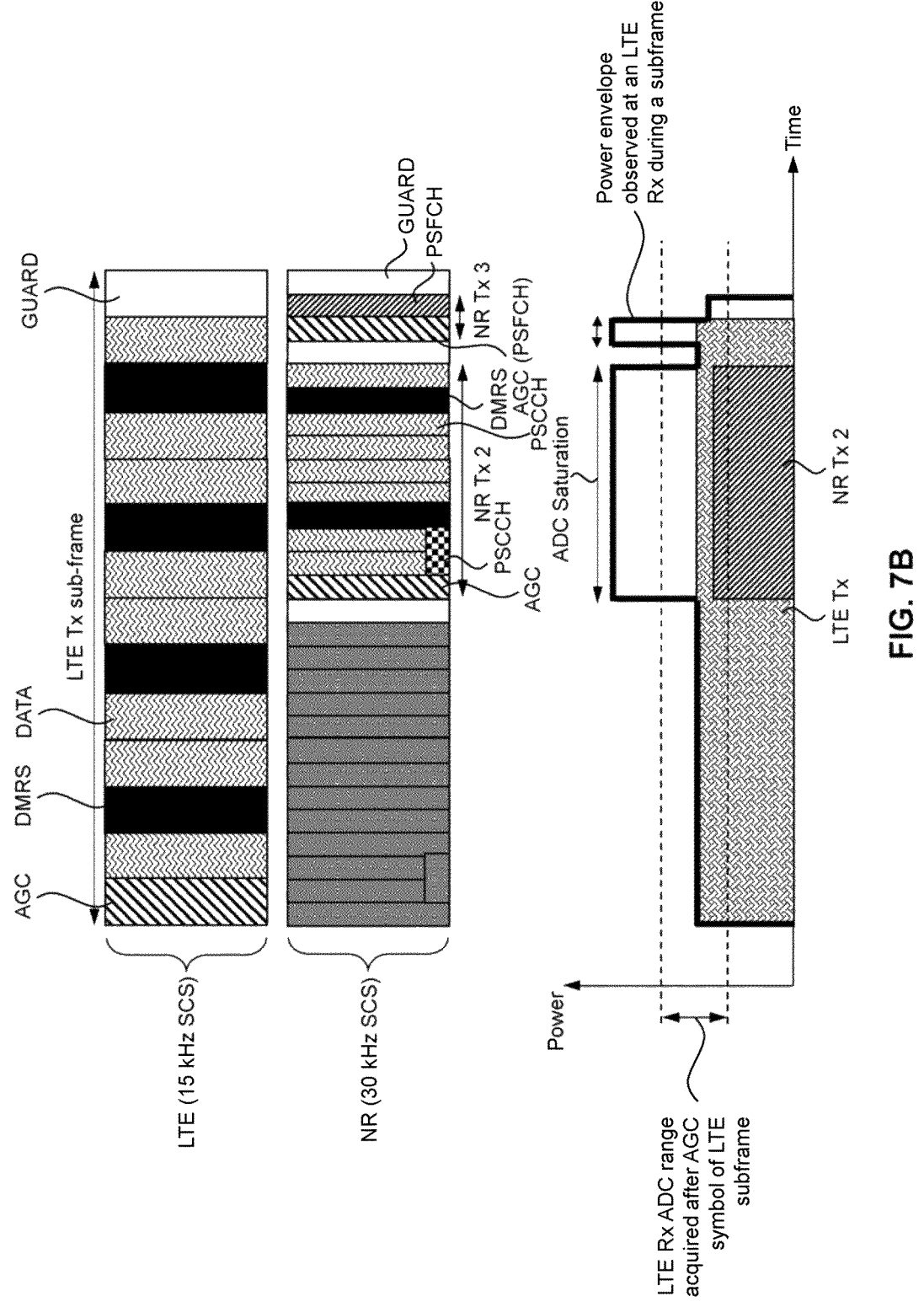
FIG. 7B is a schematic diagram illustrating another exemplary AGC issue occurring in a dynamic co-channel coexistence between NR sidelink and LTE sidelink, consistent with some embodiments of the present disclosure.

FIG. 7A and FIG. 7B explain the AGC issue occurring in resource selection for co-channel coexistence of two or more sidelink communications in mixed SCS scenarios. FIG. 7A is a schematic diagram illustrating the impact of NR sidelink transmissions on the setting of the LTE sidelink receiver's AGC when NR sidelink transmissions from different NR sidelink transmitter (Tx) UEs in both NR sidelink slots overlap with the LTE sidelink sub-frame; FIG. 7B is a schematic diagram illustrating the impact of NR sidelink transmissions on the setting of the LTE sidelink receiver's AGC when NR sidelink transmission from a NR sidelink Tx UE in the second slot overlap with the LTE sidelink sub-frame.

An AGC issue may occur when the energy in the channel changes significantly in a time instance where it is not expected. Both NR sidelink and LTE sidelink assume that the energy on the channel will not significantly change in the duration of a slot for NR sidelink or in the duration of a sub-frame for LTE sidelink. Thus, an LTE sidelink device is not allowed to change transmit power during a sub-frame. Similarly, an NR sidelink device is not allowed to change transmit power during a slot. A significant change could occur when a new sidelink device starts transmitting or stops transmitting within a slot for NR sidelink or sub-frame for LTE sidelink. During AGC, a sidelink UE sets its AGC gain according to a sensed energy on the channel. Specifically, if the sensed energy is low, the UE sets a high AGC gain; on the other hand, if the sensed energy is high, the UE sets a low AGC gain. If the channel energy changes from a low energy to a high energy, the AGC gain might be set too high, and this causes AGC saturation at the sidelink receiver (Rx) UE. On the other hand, if the channel energy changes from a high energy to a low energy, the AGC gain might be set too low, and this causes a high quantization error. The latter case is, however, considered less significant than the former case. These cases may occur when more than one NR slot overlaps in time with the LTE sub-frame, and each NR sidelink slot has its own AGC symbol and allows a new NR sidelink device to start transmitting (first case) or the first NR device stops transmitting (later case).

Referring to FIG. 7A, in a system with a dynamic co-channel coexistence between NR sidelink and LTE sidelink, the LTE sidelink uses an SCS of 15 kHz, and the NR sidelink may use an SCS higher than 15 kHz (e.g., 30 kHz). The LTE sidelink Tx resources include one or more sub-frames, each subframe (e.g., 1 ms length) consisting of 14 symbols (e.g., DFT-s-OFDM symbols). As shown in FIG. 7A, the LTE sub-frame includes one symbol for AGC, four symbols for DMRS, eight symbols for data, and one symbol for a guard period. When the NR sidelink uses an SCS of 30 kHz, the NR sidelink Tx resources include two slots (Slot 1 and Slot 2), within the duration of the single LTE sub-frame. Slot 1 is for transmission of the first NR Tx (NR Tx 1) and Slot 2 is for transmission of the second NR Tx (NR Tx 2). The third NR Tx (NR Tx 3) in Slot 2 is for PSFCH, and thus, is not for transmission. Slot 1 includes 14 symbols (e.g., OFDM symbols): one symbol for AGC, two symbols for DMRS, 10 symbols for PSSCH, and one symbol for a guard period. The first two symbols for the PSSCH also include PSCCH. Slot 2 also includes 14 symbols (e.g., OFDM symbols): one symbol for AGC, two symbols for DMRS, seven symbols for PSSCH, one symbol for AGC (PSFCH), one symbol for PSFCH, and two symbols for guard periods. The first two symbols for the PSSCH in Slot 2 also include PSCCH. The start of the NR sidelink slots and LTE sidelink sub-frame are aligned in time. In FIG. 7A, an AGC issue at LTE sidelink Rx UEs occurs because the NR sidelink transmissions in the first and second slots are from different NR sidelink UEs (NR Tx 1 and NR Tx 2) and the LTE Rx UE acquires AGC gain based on the AGC symbol of LTE subframe. More specifically, as shown in FIG. 7A, the sum of the received power of NR Tx 1 and NR Tx 2 in Slot 2 is higher than the received power of the NR Tx 1 only in Slot 1, and thus, the channel energy changes from a low energy to a high energy within a sub-frame. A similar channel energy change occurs due to NR Tx 3 for PSFCH in Slot 2. Since the AGC gain in Slot 2 is set too high, the AGC saturation at the LTE Rx UE occurs in Slot 2. The AGC saturation issue significantly degrades the communication performance of LTE sidelink.

Referring to FIG. 7B, in a system with a dynamic co-channel coexistence between NR sidelink and LTE sidelink, the LTE sidelink uses a 15 kHz SCS, and the NR sidelink uses a 30 KHz SCS. Similar to FIG. 7A, one sub-frame of the LTE Tx in FIG. 7B consists of 14 symbols: one symbol for AGC, four symbols for DMRS, eight symbols for data, and one symbol for a guard period. The difference between FIG. 7A and FIG. 7B is that in FIG. 7B, the NR sidelink transmission occurs only in the second slot. In FIG. 7B, an AGC issue at LTE sidelink Rx UEs occurs because the NR sidelink transmissions do not exist in the first slot, while the NR sidelink transmissions exist in the second slot (NR Tx 2) and the LTE Rx UE acquires AGC gain based on the AGC symbol of LTE sub-frame. More specifically, as shown in FIG. 7B, the received power of NR Tx 2 is higher at the second slot, and thus, the channel energy changes from a low energy to a high energy. Since the AGC gain is set too high at the second slot, the AGC saturation at the LTE Rx UE occurs. Similar to the case in FIG. 7A, in FIG. 7B, the AGC issue significantly degrades the communication performance of LTE sidelink.

Figure 8A:
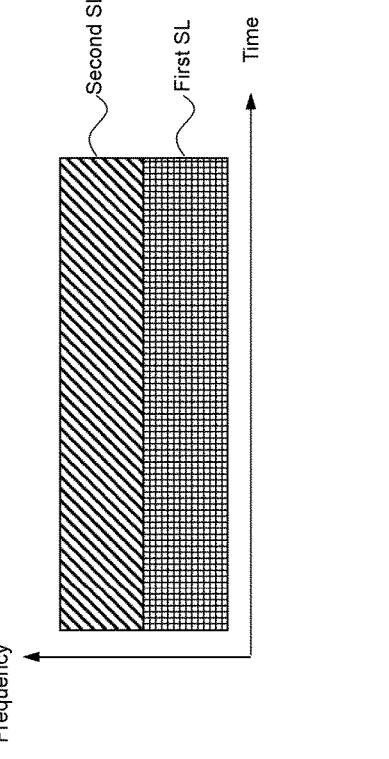
FIG. 8A is a schematic diagram illustrating a semi-static resource pool configuration in time domain multiplexing (TDM) for co-channel coexistence of a first sidelink communication and a second sidelink communication, consistent with some embodiments of the present disclosure.
Figure 8B:
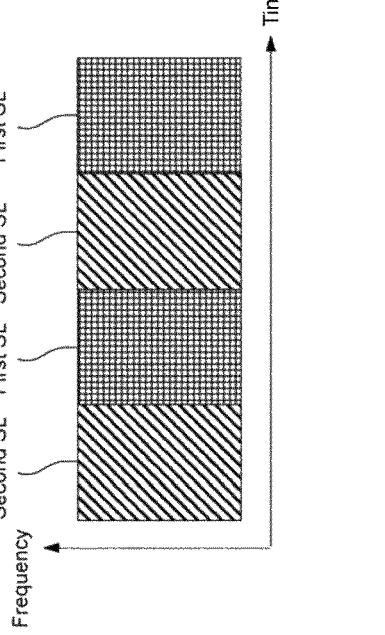
FIG. 8B is a schematic diagram illustrating a semi-static resource pool configuration in frequency domain multiplexing (FDM) for co-channel coexistence of the first sidelink communication and the second sidelink communication, consistent with some embodiments of the present disclosure.

FIG. 8A is a schematic diagram illustrating a semi-static resource pool configuration in time domain multiplexing (TDM) for co-channel coexistence of a first sidelink communication and a second sidelink communication; and FIG. 8B is a schematic diagram illustrating a semi-static resource pool configuration in frequency domain multiplexing (FDM) for co-channel coexistence of the first sidelink communication and the second sidelink communication, consistent with some embodiments of the present disclosure. In an embodiment, the first sidelink communication is 5G NR-V2X PC5 mode 2 and the second sidelink communication is LTE-V2X PC5 mode 4. In this embodiment, different resource pools in TDM or FDM are allocated for LTE SL and NR SL in a channel. But the semi-static approaches as shown in FIGS. 8A-8B may have drawbacks. For example, in the existing pre-configuration for LTE-V2X (e.g., Society of Automotive Engineers (SAE) J3161/1, European Telecommunications Standards Institute (ETSI) EN 303 613), all time and frequency resources are allocated for LTE SL. Thus, once LTE SL is deployed, the update of the resource pool configuration may not be easy due to a long car life (>10 years). Even if the update of resource pool configuration is possible for LTE SL radios already deployed, the semi-static resource pool allocation may cause under-utilization or over-utilization (e.g., channel congestion) of spectrum due to imbalance of the number of LTE SL radios and NR SL radios in a given location and/or time and the amount of allocated resource pool for each technology. In contrast, dynamic co-channel coexistence enables efficient use of spectrum because time-frequency resources are dynamically shared by LTE SL and NR SL in a distributed manner. However, an AGC issue due to mixed SCS may occur in dynamic co-channel coexistence techniques.

At least some embodiments of the present disclosure provide solutions to mitigate the AGC issue in mixed SCS scenarios.

Figure 9:
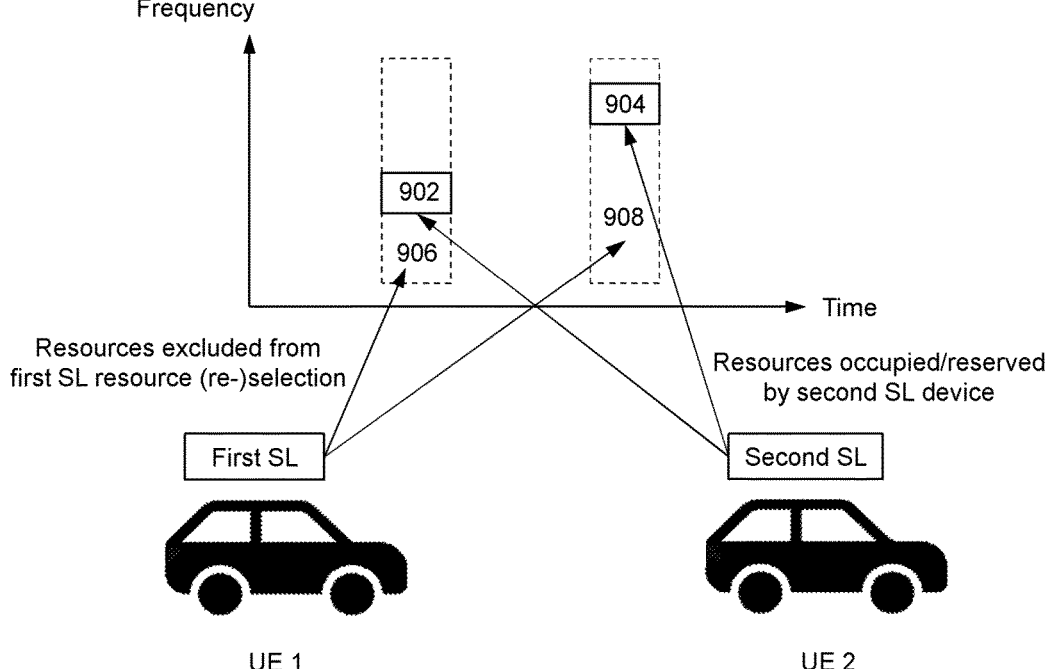
FIG. 9 is a schematic diagram illustrating a resource exclusion at sidelink devices to mitigate the AGC issue in mixed SCS scenarios, consistent with some embodiments of the present disclosure.

FIG. 9 is a schematic diagram illustrating a resource exclusion and/or selection at sidelink devices to mitigate the AGC issue in mixed SCS scenarios, consistent with some embodiments of the present disclosure. For a dynamic co-channel coexistence of the first SL and the second SL, at the first SL resource selection or reselection, a Type A device or a Type B device performs subframe-level and/or slot-level resource exclusion or avoids selecting subframes and/or slots that cause AGC issues by taking into account the resources occupied or reserved by the second SL devices, to mitigate AGC issues in mixed SCS scenarios. Referring to FIG. 9, a co-channel coexistence of a second SL and a first SL system includes a UE 1 which is a Type A device or a Type B device, and a UE 2 which is a Type C device. As shown in FIG. 9, the UE 1 excludes or avoids selecting, from the first SL resource selection or reselection, resources 902 and 904 (e.g., one or more sub-frames or slots) that are occupied and/or reserved by the UE 2, and selects resources 906 and 908 (e.g., one or more subframes or slots) that are available. In this way, the AGC issue at UE 2 in mixed SCS scenarios is mitigated. This allows for the UE 1 to enjoy the benefits of the high SCS, thereby enhancing tolerance for high Doppler and achieving lower transmission latency.

Referring to FIG. 9, in some embodiments, the first sidelink communication is 5G NR SL and the second sidelink communication is LTE SL. In an embodiment, for a dynamic co-channel coexistence of the LTE SL and NR SL, for NR SL resource selection or reselection in mixed SCS scenarios, subframe-level resource exclusion is adopted so that one or more subframes occupied and/or reserved by the LTE SL devices are excluded by the NR SL devices, as discussed with respect to FIGS. 10A-10B below. In another embodiment, for a dynamic co-channel coexistence of the LTE SL and the NR SL, for NR SL resource selection or reselection in mixed SCS scenarios, a slot-level resource exclusion is adopted so that one or more slots occupied and/or reserved by the LTE SL devices are excluded by the NR SL devices, as discussed with respect to FIGS. 11A-11B below. In another embodiment, for a dynamic co-channel coexistence of the LTE SL and the NR SL, for NR SL resource selection or reselection in mixed SCS scenarios, a subframe-level and slot-level resource exclusions are adopted by taking into account LTE SL, the priority of the LTE SL, the priority of NR SL, and the SL-RSRP, as discussed with respect to FIGS. 12A-12B below.

In some embodiments, NR SL devices (e.g., Type A and/or Type B) and LTE SL devices (e.g., Type C) share the same channel based on a dynamic co-channel coexistence. NR SL devices can obtain LTE SL sensing information of other UEs (LTE SL device; Type C). The LTE SL sensing information may include S-RSSI, SL-RSRP, channel busy ratio (CBR), and resource reservation information of the LTE SL device. In some embodiments, the NR SL devices may obtain the LTE SL sensing information based on the information shared by its own LTE SL module. In some embodiments, the NR SL devices may obtain the LTE SL sensing information based on inter-UE coordination messages received from other Type A devices.

Figures 10A, 10B:
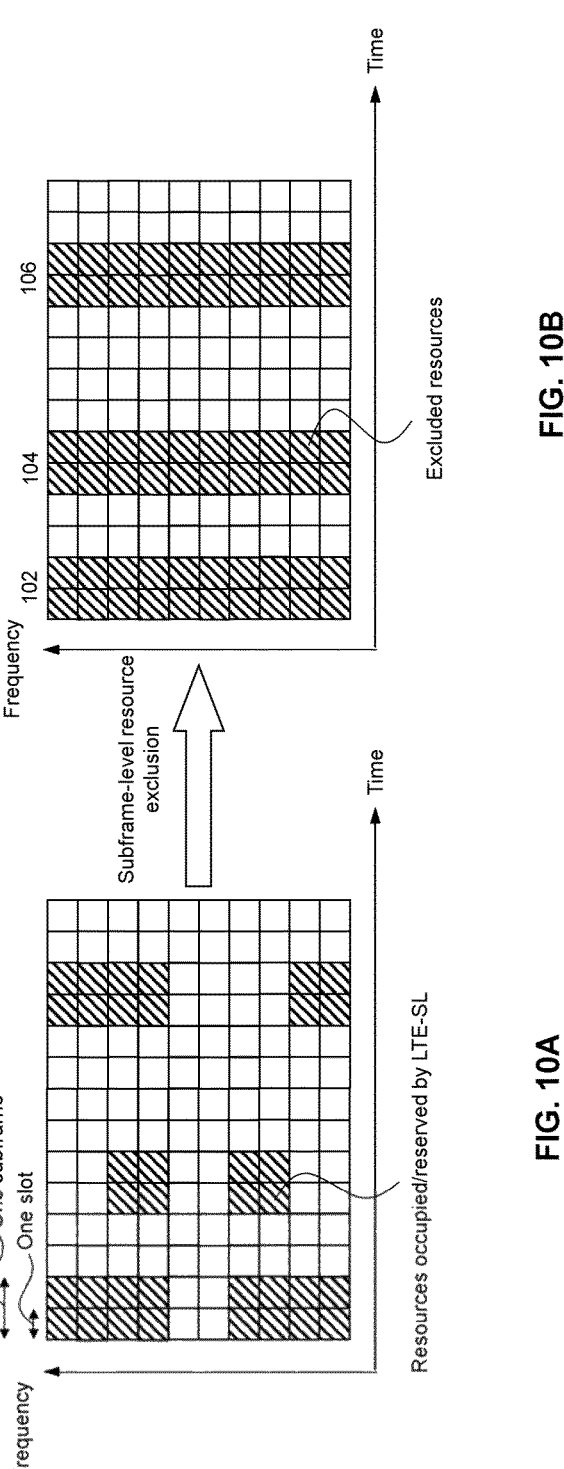
FIG. 10A is a schematic diagram illustrating resources occupied and/or reserved by LTE SL.
FIG. 10B is a schematic diagram illustrating resources excluded by performing a subframe-level resource exclusion based on the resources occupied and/or reserved by LTE SL, consistent with some embodiments of the present disclosure.

FIG. 10A is a schematic diagram illustrating resources occupied and/or reserved by LTE SL; and FIG. 10B is a schematic diagram illustrating resources excluded by performing a subframe-level resource exclusion based on the resources occupied and/or reserved by LTE SL, consistent with some embodiments of the present disclosure. In some embodiments, the LTE SL uses 15 kHz SCS, and the NR SL uses 30 KHz SCS. In these embodiments, as shown in FIG. 10A, there are two slots per subframe, where the subframe is time resource granularity of the LTE SL, and the slot is time resource granularity of the NR SL. In FIG. 10A, the resources occupied and/or reserved by the LTE SL are shown using the hatched blocks. The resources occupied and/or reserved by the LTE SL can be determined based on an LTE SL procedure. The NR SL devices (e.g., Type A or Type B) may perform subframe-level resource exclusion taking into account the LTE SL to avoid selecting sub-frames that are partly or fully occupied and/or reserved by the LTE SL. FIG. 10B shows the excluded sub-frames (indexed as 102, 104, and 106) in which a part of frequency resources are occupied and/or reserved by the LTE SL. The sub-frames 102, 104, and 106 are excluded from candidate resources. In some embodiments, the NR SL devices determine whether to perform a subframe-level resource exclusion based on some criteria. The criteria may include: (1) a measured CBR is above a pre-defined threshold, and/or (2) a percentage of the resource candidates after exclusion is below a pre-defined threshold. If it is determined that the subframe-level resource exclusion is not to be performed, the NR SL devices are allowed to share subframes with LTE SL.

Figures 11A, 11B:
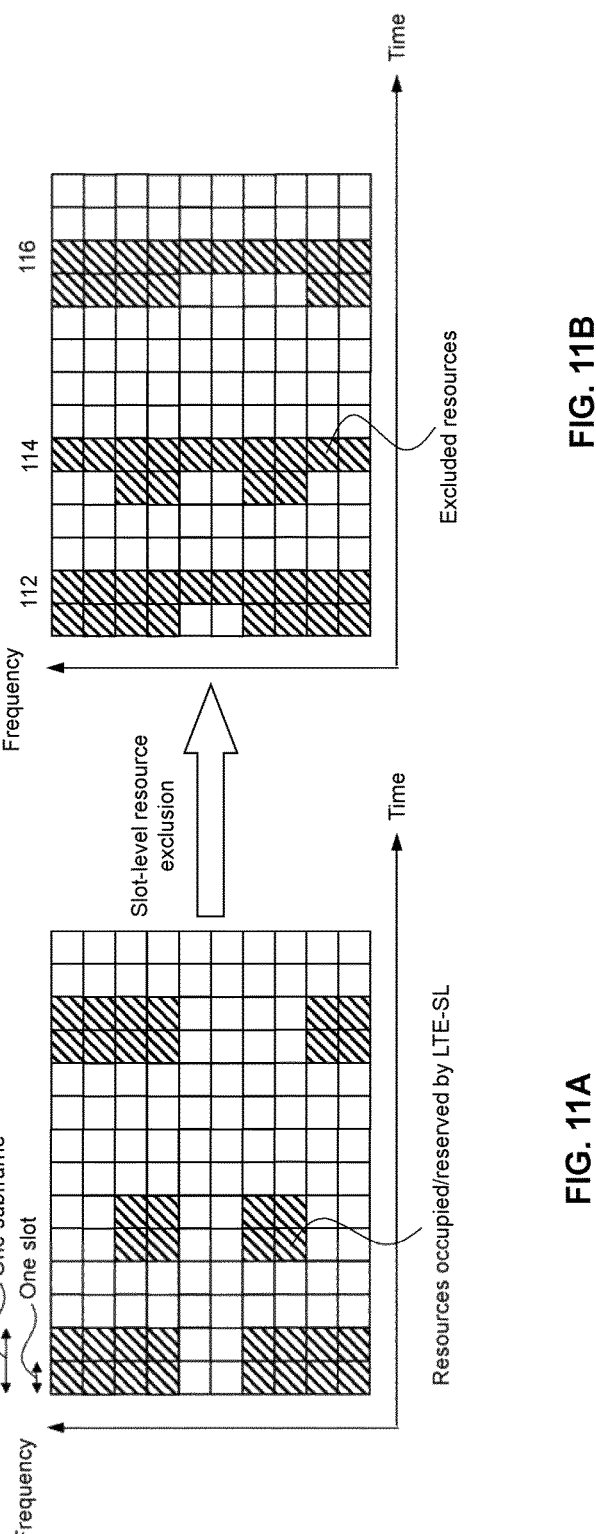
FIG. 11A is a schematic diagram illustrating resources occupied/reserved by LTE SL.
FIG. 11B is a schematic diagram illustrating resources excluded by performing a slot-level resource exclusion based on the resources occupied/reserved by LTE SL, consistent with some embodiments of the present disclosure.

FIG. 11A is a schematic diagram illustrating resources occupied and/or reserved by the LTE SL; and FIG. 11B is a schematic diagram illustrating resources excluded by performing a slot-level resource exclusion based on the resources occupied and/or reserved by the LTE SL, consistent with some embodiments of the present disclosure. In some embodiments, the LTE SL uses 15 kHz SCS, and the NR SL uses 30 kHz SCS. In these embodiments, as shown in FIG. 11A, there are two slots per subframe, where the subframe is time resource granularity of the LTE SL, and the slot is time resource granularity of the NR SL. In FIG. 11A, the resources occupied and/or reserved by the LTE SL are shown using the hatched blocks. The resources occupied and/or reserved by the LTE SL can be determined based on the LTE SL procedure. The NR SL devices (e.g., Type A or Type B) may perform a slot-level resource exclusion by taking into account the LTE SL to avoid selecting slots that are partly or fully occupied and/or reserved by the LTE SL, except the first slot within each subframe. FIG. 11B shows the excluded slots (indexed as 112, 114, and 116) in which a part of frequency resources is occupied and/or reserved by the LTE SL. The slots 112, 114, and 116 are excluded from candidate resources. In some embodiments, the NR SL devices determine whether to perform the slot-level resource exclusion based on some criteria. The criteria may include: (1) a measured CBR is above a pre-defined threshold and/or (2) a percentage of the resource candidates after exclusion is below a pre-defined threshold. If it is determined that the slot-level resource exclusion is not to be performed, the NR SL devices are allowed to share subframes with the LTE SL. In some embodiments, an NR SL device selects, in a MAC layer, the first slot of a sub-frame by avoiding selecting the second slot of the sub-frame.

Figures 12A, 12B:
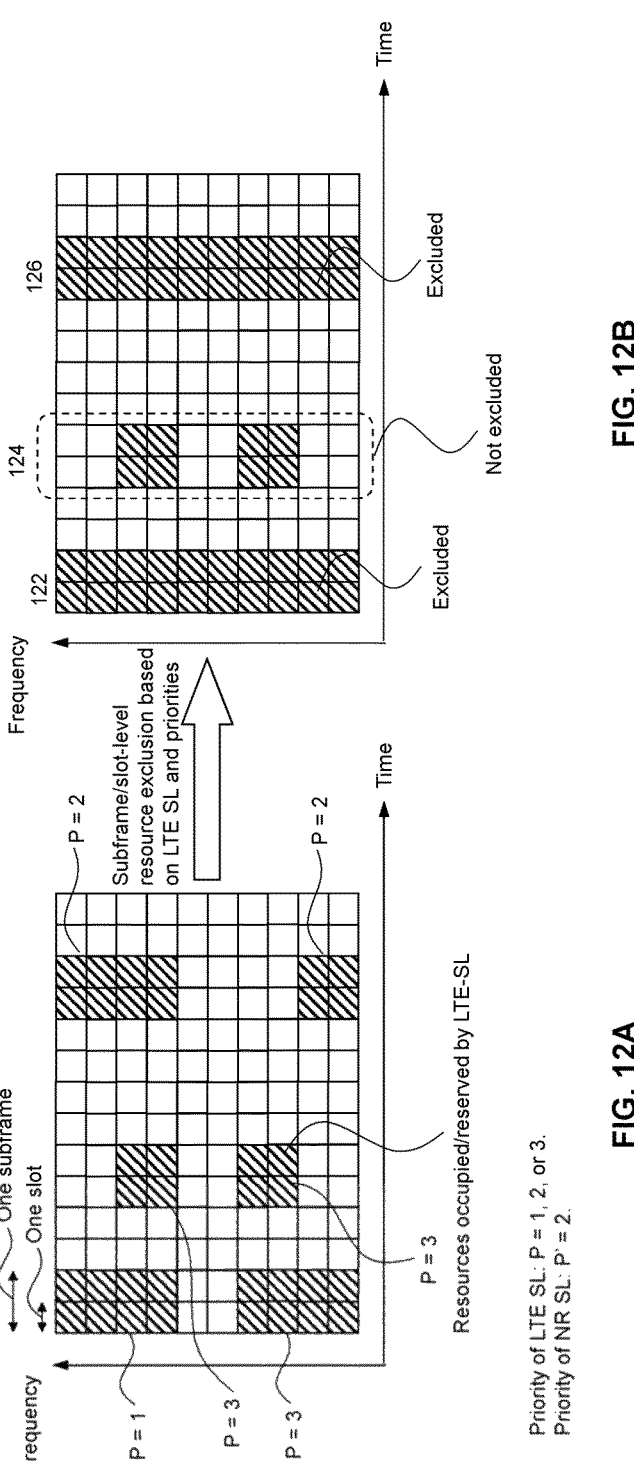
FIG. 12A is a schematic diagram illustrating resources occupied/reserved by LTE SL.
FIG. 12B is a schematic diagram illustrating resources excluded and not excluded after performing a subframe/slot-level resource exclusion based on the resources occupied/reserved by LTE SL and the priorities of the LTE SL and NR SL, consistent with some embodiments of the present disclosure.

FIG. 12A is a schematic diagram illustrating resources occupied and/or reserved by the LTE SL; and FIG. 12B is a schematic diagram illustrating the resources excluded and the resources not excluded after performing a subframe-level and/or a slot-level resource exclusion based on the resources occupied and/or reserved by the LTE SL and the priorities of the LTE SL and NRL SL, consistent with some embodiments of the present disclosure. In some embodiments, the LTE SL uses 15 KHz SCS, and the NR SL uses 30 KHz SCS. In these embodiments, as shown in FIG. 12A, there are two slots per subframe, where the subframe is time resource granularity of the LTE SL, and the slot is time resource granularity of the NR SL. In FIG. 12A, the resources occupied and/or reserved by the LTE SL are shown using the hatched blocks. The resources occupied and/or reserved by the LTE SL can be determined based on the LTE SL procedure. The NR SL devices (e.g., Type A or Type B) may take into account the priority, e.g., ProSe Per-Packet Priority (PPPP), of the LTE SL and the NR SL in subframe-level and/or slot-level resource exclusion. For example, for a given sub-frame, if all the priorities of the LTE SL packets within the sub-frame are less important than the priority of the NR SL, subframe-level and/or slot-level resource exclusion is not applied for that sub-frame. Otherwise, subframe-level and/or slot-level resource exclusion may be applied.

Referring to FIG. 12A, there are three different priorities (indicated as P=1, 2, and 3) of the resources occupied and/or reserved by the LTE SL, where P=1 indicates the highest priority (i.e., the most important) of the resources. The NR SL packet priority is P'=2. If a subframe includes LTE SL packets with a priority P=3 or larger, which are less important than the NR SL packets, the NR SL devices do not apply subframe-level and/or slot-level resource exclusion for that subframe. Otherwise, the NR devices apply subframe-level and/or slot-level resource exclusion. FIG. 12B shows the resources excluded by the subframe-level and/or slot-level resource exclusion (indexed as 122, 126). FIG. 12B also shows the resources that are occupied and/or reserved by the LTE SL but are not excluded from the candidate resources (indexed as 124). The resources 124 are not excluded because for these resources, the NR SL priority (P'=2) is more important than the LTE SL priority (P=3). In some embodiments, the LTE SL and the NR SL have eight priority levels (P or P'=1 . . . 8), in which P or P'=1 indicates the highest priority (importance) and P or P'=8 indicates the lowest priority.

Figures 13A, 13B:
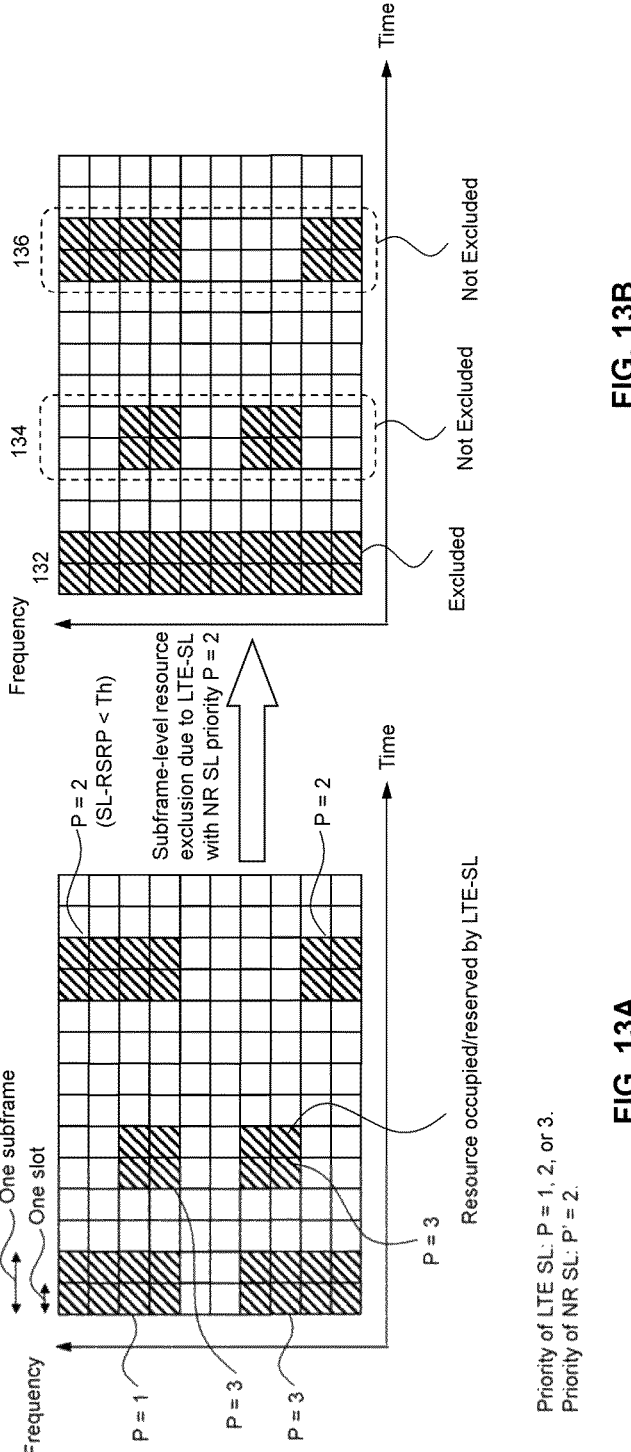
FIG. 13A is a schematic diagram illustrating resources occupied/reserved by LTE SL.
FIG. 13B is a schematic diagram illustrating resources excluded and not excluded after performing a subframe/slot-level resource exclusion based on the resources occupied/reserved by LTE SL, the priorities of the LTE SL and NRL SL, and the SL-RSRP level, consistent with some embodiments of the present disclosure.

FIG. 13A is a schematic diagram illustrating resources occupied and/or reserved by LTE SL; and FIG. 13B is a schematic diagram illustrating the resources excluded and the resources not excluded after performing a subframe-level and/or slot-level resource exclusion based on the resources occupied and/or reserved by the LTE SL, the priorities of the LTE SL and the NRL SL, and the SL-RSRP level, consistent with some embodiments of the present disclosure. In some embodiments, the LTE SL uses 15 kHz SCS, and the NR SL uses 30 KHz SCS. In these embodiments, as shown in FIG. 13A, there are two slots per subframe, where the subframe is time resource granularity of the LTE SL, and the slot is time resource granularity of the NR SL. In FIG. 13A, the resources occupied and/or reserved by the LTE SL are shown using the hatched blocks. The resources occupied and/or reserved by the LTE SL can be determined based on the LTE SL procedure. The NR SL devices (e.g., Type A or Type B) may take into account the priority, e.g., PPPP and/or SL-RSRP of the LTE SL in subframe-level and/or slot-level resource exclusion. For example, for a given sub-frame, if all the priorities of the LTE SL packets within the subframe are less important than the priority of the NR SL, subframe-level and/or slot-level resource exclusion is not applied for that subframe. If the priorities of the LTE SL packets are more important than those of the NR SL packets but the LTE SL-RSRP is below a threshold, subframe-level and/or slot-level resource exclusion may not be applied for that sub-frame. Otherwise, subframe-level and/or slot-level resource exclusion may be applied. The LTE SL-RSRP threshold can be a function of a congestion level (e.g., CBR) and a combination of the LTE SL priority and the NR SL priority. The LTE SL-RSRP threshold may be configured or pre-configured, or defined by higher layers. In an embodiment, the additional SL-RSRP check may be dependent on the NR SL priority as compared to the LTE SL priority. For example, SL-RSRP criteria may only be applied in cases where the NR SL and LTE SL have equal priority.

Referring to FIG. 13A, there are three different priorities (indicated as P=1, 2, and 3) of the resources occupied and/or reserved by the LTE SL, where P=1 indicates the highest priority (i.e., the most important) of the resources. The NR SL packet priority is P'=2. The NR SL subframe-level and/or slot-level resource exclusion takes into account the LTE SL, the priorities of the LTE SL, the priority of the NR SL, and the SL-RSRP. If a sub-frame includes LTE SL packets with priority P=3 or larger, which are less important than the NR SL packets, the NR SL devices do not apply subframe-level and/or slot-level resource exclusion for that subframe. Otherwise, the NR devices apply subframe-level and/or slot-level resource exclusion. FIG. 13B shows the resources excluded by the subframe-level and/or slot-level resource exclusion (indexed as 132). FIG. 13B also shows the resources that are occupied and/or reserved by the LTE SL but are not excluded from the candidate resources (indexed as 134 and 136). For the resources 134, a subframe-level and/or slot-level resource exclusion is not applied because NR SL priority (P'=2) is more important than the LTE SL priority (P=3). For the resources 136, a subframe-level and/or slot-level resource exclusion is not applied because the LTE SL priority (P=2) is the same as NR SL priority (P'=2), but the LTE SL-RSRP is below a threshold. In some embodiments, the LTE SL and the NR SL have eight priority levels (P=1 . . . 8), in which the P=1 indicates the highest priority and the P=8 indicates the lowest priority.

In some embodiments, the above-described exclusion rules are applied at a Type A device when the presence of LTE SL is detected and/or the ratio of slots/sub-frames with and without LTE SL transmissions is above a configured threshold. In some embodiments, the exclusion rules are applied at a Type B device when the Type B device is provided information about the LTE SL activity from another source.

Figure 14:
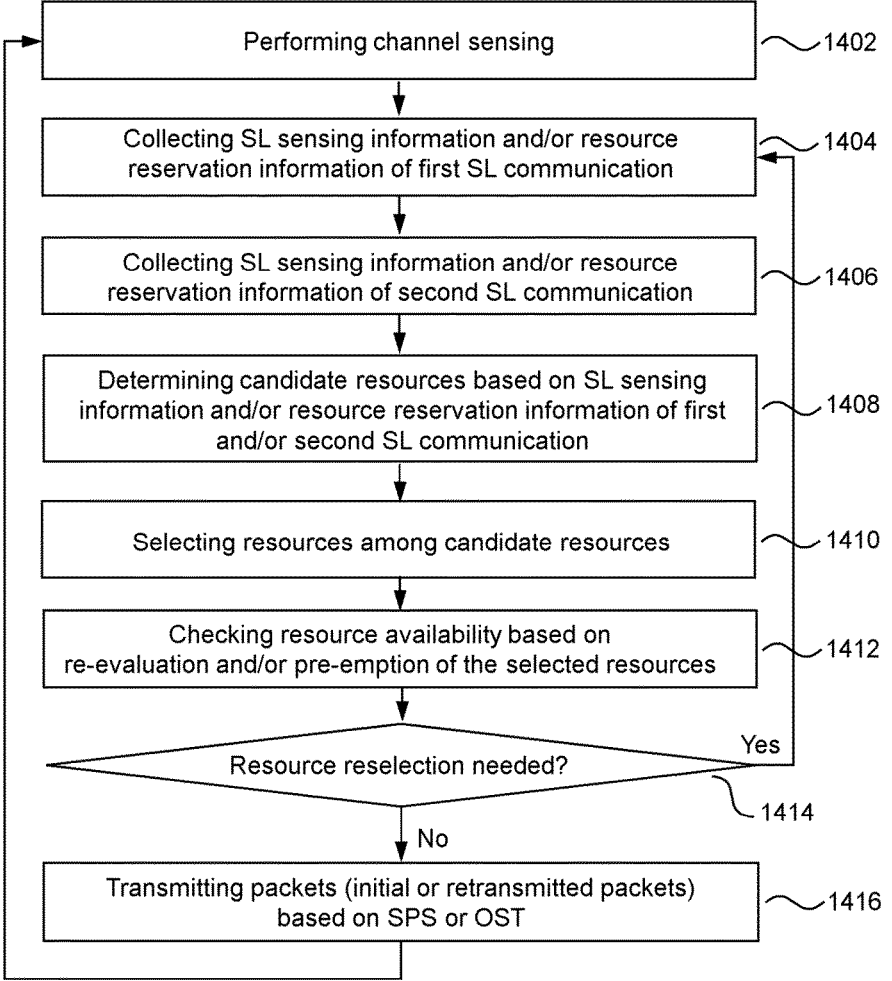
FIG. 14 is a flow chart illustrating a method for resource selection or reselection in sidelink communications, consistent with some embodiments of the present disclosure.

FIG. 14 is a flow chart illustrating a method 1400 for resource selection or reselection in sidelink communications, consistent with some embodiments of the present disclosure. The method 1400 may be performed by a UE in a sidelink communication.

The method 1400 includes a step 1402 of performing a channel sensing (e.g., background sensing or any other type of full sensing or partial sensing). For example, for resource selection, the UE may perform a channel sensing in a sensing window (e.g., 100 or 1100 ms). The sensing window of 100 ms may be for an aperiodic traffic, while the sensing window of 1100 ms may be for a periodic traffic. The sensing window can be any time duration, depending on the UE implementation. Through background channel sensing, the UE may obtain information regarding the resources occupied or reserved by other UEs, for example, based on the resource reservation and corresponding SL-RSRPs and/or S-RSSI measurements. In some embodiments, the step 1402 is optional, and the UE receives the information regarding the resources occupied or reserved by other UEs from a network node or other devices.

The method 1400 includes a step 1404 of collecting at least one of sidelink sensing information or resource reservation information of a first sidelink communication. For example, in an embodiment, the first sidelink communication is an NR sidelink communication and the UE collects at least one of sidelink sensing information or resource reservation information of the NR sidelink communication. In some embodiments, collecting the sidelink sensing information of the first sidelink communication includes measuring one or more SL-RSRPs of the first sidelink communication, corresponding to the resource reservation information of the first sidelink communication.

The method 1400 includes a step 1406 of collecting at least one of sidelink sensing information or resource reservation information of a second sidelink communication. For example, in an embodiment, the second sidelink communication is an LTE sidelink communication and the UE collects at least one of sidelink sensing information or resource reservation information of the LTE sidelink communication. In some embodiments, collecting the sidelink sensing information of the second sidelink communication includes measuring one or more SL-RSRPs of the second sidelink communication, corresponding to the resource reservation information of the second sidelink communication.

In some embodiments, the UE may perform the background channel sensing in a sensing window and collect the information regarding resources occupied or reserved by other UEs based on an SCI decoding to identify candidate resources in a selection window. The SCI may be included in the PSCCH received by the UE from other UEs. In some embodiments, the UE may decode SCI using two stages: a first stage SCI (SCI format 1-A) and a second stage SCI (SCI format 2-A or 2-B) as defined in 3GPP standard. The first stage SCI may carry resource reservation information for future transmissions, and the information about resource allocation and MCS for PSSCH, DMRS pattern, the second stage SCI format, etc. The second stage SCI may carry control information for HARQ procedures, IDs for source and/or destination, information for distance-based groupcast (e.g., UE's zone ID and communication range requirement), etc. Based on the resource reservation included in the first stage SCI, the UE can avoid selecting the time and/or frequency resources occupied or reserved by other UEs during its resource selection or reselection.

In some embodiments, the UE may use inter-UE coordination information, in which one or more other UEs send information about the resources to the UE, and the UE utilizes that information for its resource selection or reselection. In an embodiment, the inter-UE coordination information includes indications of resources that are preferred to be included in the UE's selection or reselection, or preferred to be excluded from the UE's selection or reselection. In an embodiment, the UE does not support sensing and/or resource exclusion, and the UE entirely relies on the inter-UE coordination information in resource selection or reselection. In an embodiment, the UE may combine the inter-UE coordination information with the resources identified by its own sensing procedure, before making a final selection or reselection. In another embodiment, the UE may use an inter-UE coordination scheme in which the one or more other UEs provide to the UE an indication that resources reserved for the UE's transmission is subject to a conflict with a transmission from other devices. In this case, the UE re-selects new resources. The indication from the one or more other UEs can be sent in PSFCH.

The method 1400 includes a step 1408 of determining one or more candidate resources based on at least one of: the sidelink sensing information of the first sidelink communication, the resource reservation information of the first sidelink communication, the sidelink sensing information of the second sidelink communication, or the resource reservation information of the second sidelink communication. For example, in an embodiment, the first sidelink communication is an NR sidelink communication and the second sidelink communication is an LTE sidelink communication and the UE determines one or more candidate resources based on at least one of: the NR sidelink sensing information, the NR resource reservation information, the LTE sidelink sensing information, or the LTE resource reservation information.

In some embodiments, determining the one or more candidate resources includes excluding one or more resources from a set of resources based on at least one of: one or more resource reservations of the first sidelink communication having one or more corresponding SL-RSRPs above a first threshold or one or more resource reservations of the second sidelink communication having one or more corresponding SL-RSRPs above a second threshold. In an embodiment, excluding the one or more resources from a set of resources further includes configuring or preconfiguring one or more SL-RSRP thresholds for one or more combinations of the first sidelink priorities and the second sidelink priorities.

In some embodiments, determining the one or more candidate resources includes excluding from a set of resources one or more subframes of the first sidelink communication that overlap with one or more subframes of the second sidelink communication. The exclusion may be performed in a physical layer. In an embodiment, the first sidelink communication is an NR sidelink communication that uses a SCS of 15 KHz, 30 kHz, or 60 KHz, and the second sidelink communication is an LTE sidelink communication that uses a SCS of 15 KHz.

In some embodiments, determining the one or more candidate resources includes excluding from a set of resources one or more slots of the first sidelink communication that overlap with one or more sub-frames of the second sidelink communication. The exclusion may be performed in a physical layer. The one or more slots do not include the first slot of the first sidelink communication. In an embodiment, the first sidelink communication is an NR sidelink communication that uses a SCS of 15 kHz, 30 kHz, or 60 kHz, and the second sidelink communication is an LTE sidelink communication that uses a SCS of 15 KHz.

In an embodiment, the UE determines the one or more candidate resources based on information received from one or more second UEs. The received information may include at least one of: the sidelink sensing information of the first sidelink communication, the resource reservation information of the first sidelink communication, the sidelink sensing information of the second sidelink communication, or the resource reservation information of the second sidelink communication. The UE may send a request to the one or more second UEs to share the information, and in response, receives the information. The UE may send the request to the one or more second UEs, for example, based on at least one of: a physical-layer signaling, a MAC-layer signaling, a Radio Resource Control (RRC) layer signaling, or a higher-layer signaling. In an embodiment, the UE may also send to the one or more second UEs an indication of a type of the UE or one or more sidelink communication protocols that the UE supports. The UE may send the indication based on at least one of: a physical-layer signaling, a MAC-layer signaling, an RRC layer signaling, or a higher-layer signaling. In an embodiment, the information received by the UE from the one or more second UEs includes at least one of: the resource reservation information of the first sidelink communication, the resource reservation information of the second sidelink communication, one or more SL-RSRPs of the first sidelink communication, one or more SL-RSRPs of the second sidelink communication, one or more S-RSSIs of the first sidelink communication, one or more S-RSSIs of the second sidelink communication, one or more priorities of the first sidelink communication, or one or more priorities of the second sidelink communication.

In an embodiment, the UE may further receive, from the one or more second UEs, at least one of: position information of the one or more second UEs, one or more physical coordinates of the one or more second UEs, an identity of a cell where the one or more second UEs are camped on, one or more identities of one or more devices from which the one or more second UEs receive sidelink signals, or a zone identification identifying a location of one or more second UEs. In this embodiment, determining the one or more candidate resources further includes taking into account information shared from the one or more second UEs if the one or more second UE are in proximity. The proximity of the one or more second UEs may be determined based on a distance threshold. For example, if a distance between the UE and the one or more second UEs are smaller than a threshold distance, the UE considers that the information received from the one or more second UEs is reliable and accurate. In an embodiment, the UE identifies the one or more candidate resources by jointly taking into account at least one of: the sidelink sensing information of the first sidelink communication or the resource reservation information of the first sidelink communication, and at least one of the sidelink sensing information of the second sidelink communication or the resource reservation information of the second sidelink communication.

Still referring to FIG. 14, the method 1400 includes a step 1410 of selecting one or more resources among the one or more candidate resources. In some embodiments, selecting the one or more resources among the one or more candidate resources includes avoiding selecting one or more resources from a set of resources based on at least one of: one or more resource reservation information of the first sidelink communication, resource reservation information of the second sidelink communication, one or more SL-RSRPs of the first sidelink communication, one or more SL-RSRPs of the second sidelink communication, one or more sidelink received signal strength indicators (S-RSSIs) of the first sidelink communication, one or more S-RSSIs of the second sidelink communication, one or more priorities of the first sidelink communication, or one or more priorities of the second sidelink communication. In some embodiments, avoiding selecting the one or more resources from the set of resources includes configuring or preconfiguring one or more initial SL-RSRP thresholds for one or more combinations of one or more first sidelink priorities and one or more second sidelink priorities.

In an embodiment, selecting the one or more resources among the one or more candidate resources further includes selecting, from the one or more candidate resources, one or more resources within at least a first slot of two or more slots of the first sidelink communication that overlap with one or more subframe of the second sidelink communication. For example, in an embodiment, the first sidelink communication is an NR sidelink communication that uses an SCS of 15 kHz, 30 kHz, or 60 KHz, and the second sidelink communication is an LTE sidelink communication that uses an SCS of 15 kHz, and selecting the one or more resources among the one or more candidate resources further includes selecting, in a MAC layer, one or more resources within a first slot of the two or more slots of the NR sidelink communication that overlaps with one or more subframes of the LTE sidelink communication, from the one or more candidate resources of the NR sidelink communication.

The method 1400 includes a step 1412 of checking resource availability at least one time after the resource selection and before the transmission based on a re-evaluation of the one or more selected resources or a pre-emption of the one or more selected resources. In an embodiment, the checking of the resource availability is performed for the packets that arrive after the resource selection.

The method 1400 includes a step 1414 of determining whether a resource reselection is needed. In some embodiments, in response to a determination that the resource reselection is needed, the method is iterated at least a portion of a method including at least one of: the collecting at least one of the sidelink sensing information or the resource reservation information of the first sidelink communication, or the collecting at least one of the sidelink sensing information or the resource reservation information of the second sidelink communication.

The method 1400 may include a step 1416 of transmitting one or more packets using the one or more selected resources in response to a determination that the resource reselection is not needed. In some embodiments, the one or more packets are transmitted to a particular destination or device by a unicast. In some embodiments, the one or more packets are transmitted to a plurality of devices by a groupcast or broadcast. In some embodiments, the one or more packets are transmitted based on a semi-persistent scheduling or a one-shot transmission.

In some embodiments, the method 1400 may be performed by a Type A device. The Type A devices can obtain accurate LTE SL sensing information because the Type A devices include both LTE SL and NR SL modules. In some embodiments, the method 1400 may be performed by a Type B device. The Type B devices contain NR SL module and can acquire resource allocation information by means of inter-UE coordination messages. In some embodiments, a Type B device may request inter-RAT (Radio Access Technology) sidelink measurements from another device. For example, a Type B device only having an NR SL module may request LTE SL sensing information from a Type A device, after establishing a unicast and/or PC5-RRC link. In some embodiments, the Type B device requesting inter-RAT measurements may configure a new measurement object in an RRC reconfiguration message. Each measurement object may be composed of a field that conveys information about the measured frequency resource, a field to indicate measurement identity (ID), and several objects can be added into a list, and the measurement object can be specified for SL measurements of another RAT. The inter-RAT measurements are then reported back to the requesting device (e.g., the Type B device) so that the SL measurement and sensing data of other RATs are conveyed to the requesting device. In some embodiments, the LTE SL measurement and sensing data are transferred from a Type A device to a Type B device to support co-channel coexistence of LTE SL and NR SL devices.

In some embodiments, upon reception of the object, a device (e.g., a Type A device) may perform SL sensing of another RAT and populate fields in a measurement report. The measurement report includes a list of other device's SL resource reservation information. The measurement information concerns other devices that are operating with another RAT than the device that requested the measurement. The measurement report is issued at the same RAT as is used by the device that requested the measurement. In some embodiments, the LTE SL measurements are performed by a Type A device and reported to a Type B device by using NR radio interface. In some embodiments, the report from the Type A device may include complete SCI or a subset of SCI fields. The measurements quantities may include at least one of: SL-RSRP, average S-RSSI (averaged with 100 ms interval), S-RSSI for each sub-channel, or priority of the SL.

In some embodiments, the requesting device is located far away from the device that performs the measurements. In these embodiments, the measurement report includes information about a position of the device that performed the measurements so that the requesting device can determine whether the measurement data are useful, thereby enhancing accuracy and reliability of the measurement report. The position of the device that performed the measurements can be indicated using any parameters, including, but are not limited to, physical coordinates of the device, an identity (ID) of the cell where the device is camped on, an ID of a roadside unit (RSU) that the device can receive, or a zone ID where the device is located.

In some embodiments, the position information can be used by the requesting device to filter measurement results. If the measurements are performed within proximity to the requesting device, the measurement data are considered reliable and accurate. Otherwise, the measurement data are unreliable and inaccurate. In some embodiments, the measurements that are performed within a certain distance range from the requesting device are selectively used by the requesting device. The range may be determined based on the comparison of the distance between the requesting device and the measurement place with a distance threshold. The distance threshold can be fixed, pre-configured, or dynamically configurable by the network. In this way, inaccurate measurement data can be discarded or omitted.

In some embodiments, a Type B UE requests inter-RAT measurements support from a Type A UE via MAC CE. In this case, the Type B UE may broadcast to all UEs in its vicinity or groupcast to a specific group of UEs configured to support the intra-RAT measurements. In some embodiments, a UE 1 can indicate in its first stage SCI the UE Type (e.g., Type A or B). In case of UE 1 being Type B, other Type A devices in the vicinity of the UE 1 can decide to notify the UE 1 that LTE transmissions are going to collide (at least in time and therefore create AGC issue) with the UE 1's reserved transmission. In case of UE 1 being of a Type A device, the other Type A devices can decide to notify the UE 1 that LTE transmission is going to collide (at least in time) based on the reservation from the LTE transmission being also expected to have been received at UE 1 device but the UE 1's reservation is still colliding in time with the LTE transmission. This last aspect is to address hidden node problem at the UE 1 side.

Figure 15:
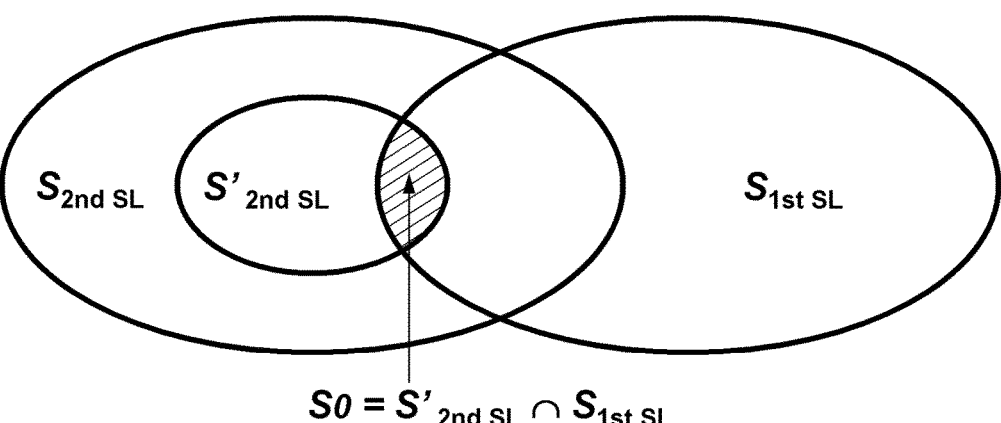
FIG. 15 is a schematic diagram illustrating a method for determining resource candidates in co-channel coexistence of a first sidelink communication and a second sidelink communication, consistent with some embodiments of the present disclosure.

FIG. 15 is a schematic diagram illustrating a method for determining resource candidates in a co-channel coexistence of a first sidelink communication and a second sidelink communication, consistent with some embodiments of the present disclosure. Referring to FIG. 15, in some embodiments, determining the one or more candidate resources includes a step of determining a first set of candidate resources ($S_{2nd\ SL}$) based on the second sidelink communication. The first set of candidate resources may be determined based on any of the methods discussed below.

In some embodiments, determining the first set of candidate resources may include excluding one or more resources from available resources based on at least one of: resource reservation information of the first sidelink communication, resource reservation information of the second sidelink communication, a SL-RSRP of the first sidelink communication, a SL-RSRP of the second sidelink communication, a S-RSSI of the first sidelink communication, a S-RSSI of the second sidelink communication, a priority of the first sidelink communication, or a priority of the second sidelink communication. The excluding the one or more resources from the available resources may further include configuring or preconfiguring one or more initial SL-RSRP thresholds for different combinations of the second sidelink communication and the first sidelink communication priorities, and excluding the one or more resources from available resources based on one or more initial SL-RSRP thresholds.

In some embodiments, determining the first set of candidate resources may include excluding one or more resources from available resources based on the second sidelink communication resource reservation having an SL-RSRP above a threshold. This procedure may further include configuring or preconfiguring one or more SL-RSRP thresholds for different combinations of the second sidelink communication and the first sidelink communication priorities.

In some embodiments, determining the first set of candidate resources may include excluding one or more resources from available resources based on a second sidelink communication average S-RSSI. This procedure may include configuring or preconfiguring one or more S-RSSI thresholds for different first sidelink communication priorities.

Still referring to FIG. 15, the method for determining resource candidates in a co-channel coexistence of a first sidelink communication and a second sidelink communication also includes a step of determining a second set of candidate resources ($S'_{2nd\ SL}$) by applying a resource exclusion to the first set of candidate resources ($S_{2nd\ SL}$). The second set is a subset of the first set. The resource exclusion may be a subframe-level exclusion and/or slot-level exclusion.

The method for determining resource candidates in a co-channel coexistence of a first sidelink communication and a second sidelink communication further includes a step of determining a third set of candidate resources ($S_{1st\ SL}$) based on the first sidelink communication information and identifying an intersection ($S_0$) of the second set ($S'_{2nd\ SL}$) and the third set ($S_{1st\ SL}$) as the candidate resources. In some embodiments, determining the first sidelink communication resource candidates may include identifying the candidate resources by jointly taking into account the second sidelink communication sensing information and the first sidelink communication sensing information.

Figure 16:
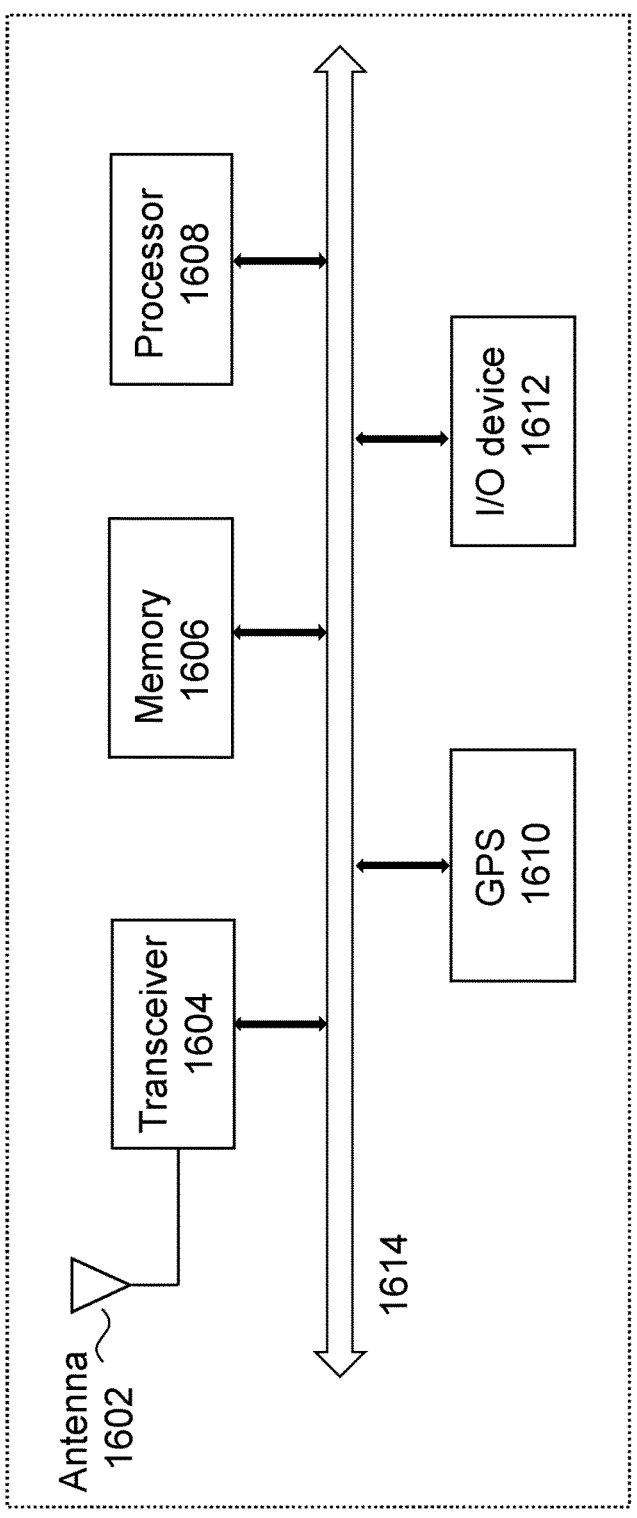
FIG. 16 is a block diagram of a UE, consistent with some embodiments of the present disclosure.

FIG. 16 is a block diagram of a UE 1600, consistent with some embodiments of the present disclosure. The UE 1600 can be a Type A, Type B, Type C, or any other type of UE. UE 1600 may be mounted in a moving vehicle or in a fixed position. UE 1600 may take any form, including but not limited to, a vehicle, a component mounted in a vehicle, a road-side unit, a laptop computer, a wireless terminal including a mobile phone, a wireless handheld device, or wireless personal device, or any other form. Referring to FIG. 16, the UE 1600 may include antenna 1602 that may be used for transmission or reception of electromagnetic signals to/from a base station or other UEs. The Antenna 1602 may include one or more antenna elements and may enable different input-output antenna configurations, for example, multiple input multiple output (MIMO) configuration, multiple input single output (MISO) configuration, and single input multiple output (SIMO) configuration. In some embodiments, the antenna 1602 may include multiple (e.g., tens or hundreds) antenna elements and may enable multi-antenna functions such as beamforming. In some embodiments, the antenna 1602 is a single antenna.

The UE 1600 may include a transceiver 1604 that is coupled to the antenna 1602. The transceiver 1604 may be a wireless transceiver at the UE 1600 and may communicate bi-directionally with a base station or other UEs. For example, the transceiver 1604 may receive/transmit wireless signals from/to a base station via downlink/uplink communication. The transceiver 1604 may also receive/transmit wireless signals from/to another UE or RSU via sidelink communication. The transceiver 1604 may include a modem to modulate the packets and provide the modulated packets to the antenna 1602 for transmission, and to demodulate packets received from the antenna 1602.

The UE 1600 may include a memory 1606. The memory 1606 may be any type of computer-readable storage medium including volatile or non-volatile memory devices, or a combination thereof. The computer-readable storage medium includes, but is not limited to, non-transitory computer storage media. A non-transitory storage medium may be accessed by a general purpose or special purpose computer. Examples of non-transitory storage medium include, but are not limited to, a portable computer diskette, a hard disk, random access memory (RAM), read-only memory (ROM), an erasable programmable read-only memory (EPROM), electrically erasable programmable ROM (EE-PROM), a digital versatile disk (DVD), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable medium.

The memory 1606 may store information related to identities of device 1600 and the signals and/or data received by antenna 1602. The memory 1606 may also store post-processing signals and/or data. The memory 1606 may also store computer-readable program instructions, mathematical models, and algorithms that are used in signal processing in transceiver 1604 and computations in processor 1608. The memory 1606 may further store computer-readable program instructions for execution by processor 1608 to operate UE 1600 to perform various functions described in this disclosure. In some examples, the memory 1606 may include a basic input/output system (BIOS) which may control basic hardware or software operation such as the interaction with peripheral components or devices. In some embodiments, the UE 1600 is a Type A UE and the memory 1606 includes both LTE SL and NR SL modules. In some embodiments, the UE 1600 is a Type B UE and the memory 1606 includes an NR SL module only. In some embodiments, the UE 1600 is a Type C UE and the memory 1606 includes an LTE SL module only.

The computer-readable program instructions of the present disclosure may be assembler instructions, instruction-set-architecture (ISA) instructions, machine instructions, machine-dependent instructions, microcode, firmware instructions, state-setting data, or source code or object code written in any combination of one or more programming languages, including an object-oriented programming language, and conventional procedural programming languages. The computer-readable program instructions may execute entirely on a computing device as a stand-alone software package, or partly on a first computing device and partly on a second computing device remote from the first computing device. In the latter scenario, the second, remote computing device may be connected to the first computing device through any type of network, including a local area network (LAN) or a wide area network (WAN).

The UE 1600 may include a processor 1608 that may include a hardware device with processing capabilities. The processor 1608 may include at least one of a general-purpose processor, a digital signal processor (DSP), a central processing unit (CPU), a microcontroller, an application specific integrated circuit (ASIC), a field programmable gate array (FPGA), a programmable logic device, a discrete gate or transistor logic component, a discrete hardware component, or other programmable logic device. Examples of the general-purpose processor include, but are not limited to, a microprocessor, any conventional processor, a controller, a microcontroller, or a state machine. In some embodiments, the processor 1608 may be implemented using a combination of devices (e.g., a combination of a DSP and a microprocessor, multiple microprocessors, one or more microprocessors in conjunction with a DSP core, or any other such configuration). The processor 1608 may receive, from transceiver 1604, downlink signals or sidelink signals and further process the signals. The processor 1608 may also receive, from transceiver 1604, data packets and further process the packets. In some embodiments, the processor 1608 may be configured to operate a memory using a memory controller. In some embodiments, a memory controller may be integrated into the processor 1608. The processor 1608 may be configured to execute computer-readable instructions stored in a memory (e.g., the memory 1606) to cause the UE 1600 to perform various functions.

The UE 1600 may include a global positioning system (GPS) 1610. The GPS 1610 may be used for enabling location-based services or other services based on a geographical position of the UE 1600. The GPS 1610 may receive global navigation satellite systems (GNSS) signals from a single satellite or a plurality of satellite signals via the antenna 1602 and provide a geographical position of the UE 1600 (e.g., coordinates of the UE 1600).

The UE 1600 may include an input/output (I/O) device 1612 that may be used to communicate a result of signal processing and computation to a user or another device. The I/O device 1612 may include a user interface including a display and an input device to transmit a user command to processor 1608. The display may be configured to display a status of signal reception at the UE 1600, the data stored at memory 1606, a status of signal processing, and a result of computation, etc. The display may include, but is not limited to, a cathode ray tube (CRT), a liquid crystal display (LCD), a light-emitting diode (LED), a gas plasma display, a touch screen, or other image projection devices for displaying information to a user. The input device may be any type of computer hardware equipment used to receive data and control signals from a user. The input device may include, but is not limited to, a keyboard, a mouse, a scanner, a digital camera, a joystick, a trackball, cursor direction keys, a touchscreen monitor, or audio/video commanders, etc.

The UE 1600 may further include a machine interface 1614, such as an electrical bus that connects the transceiver 1604, the memory 1606, the processor 1608, the GPS 1610, and the I/O device 1612.

In some embodiments, the UE 1600 may be configured to or programmed for sidelink communications. The processor 1608 may be configured to execute the instructions stored in the memory 1606 to perform a background channel sensing. The processor 1608 may be configured to execute the instructions to collect at least one of sidelink sensing information or resource reservation information of a first sidelink communication, and collect at least one of sidelink sensing information or resource reservation information of a second sidelink communication. The processor 1608 may be configured to execute the instructions to determine one or more candidate resources based on at least one of: the sidelink sensing information of the first sidelink communication, the resource reservation information of the first sidelink communication, the sidelink sensing information of the second sidelink communication, or the resource reservation information of the second sidelink communication. The processor 1608 may be configured to execute the instructions to select one or more resources among the one or more candidate resources, check resource availability for the at least one packet that arrives after the resource selection based on a reevaluation of the one or more selected resources or a preemption of the one or more selected resources, and determine whether a resource reselection is needed. If the processor 1608 determines that the resource reselection is not needed, the processor 1608 may be configured to execute the instructions to transmit, using the one or more selected resources, one or more packets. If the processor 1608 determines that the resource reselection is needed, the processor 1608 may be configured to iterate the method from the collecting at least one of the sidelink resource sensing information or the resource reservation information of the first sidelink communication.

As used in this disclosure, use of the term "or" in a list of items indicates an inclusive list. The list of items may be prefaced by a phrase such as "at least one of" or "one or more of." For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification, the terms "comprise," "include," or "contain" may be used interchangeably and have the same meaning and are to be construed as inclusive and open-ended. The terms "comprise," "include," or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

The flowcharts and block diagrams in the figures illustrate examples of the architecture, functionality, and operation of possible implementations of systems, methods, and devices according to various embodiments. It should be noted that, in some alternative implementations, the functions noted in blocks may occur out of the order noted in the figures. For example, two blocks shown in succession may, in fact, be executed substantially concurrently, or the blocks may sometimes be executed in the reverse order, depending upon the functionality involved. Likewise, additional steps may be included in such methods, and certain steps may be omitted or combined, in methods consistent with various embodiments.

It is understood that the described embodiments are not mutually exclusive, and elements, components, materials, or steps described in connection with one example embodiment may be combined with, or eliminated from, other embodiments in suitable ways to accomplish desired design objectives.

Reference herein to "some embodiments" or "some exemplary embodiments" means that a particular feature, structure, or characteristic described in connection with the embodiment can be included in at least one embodiment. The appearance of the phrases "one embodiment" "some embodiments" or "another embodiment" in various places in the present disclosure do not all necessarily refer to the same embodiment, nor are separate or alternative embodiments necessarily mutually exclusive of other embodiments.

Additionally, the articles "a" and "an" as used in the present disclosure and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

Although the elements in the following method claims, if any, are recited in a particular sequence, unless the claim recitations otherwise imply a particular sequence for implementing some or all of those elements, those elements are not necessarily intended to be limited to being implemented in that particular sequence.

It is appreciated that certain features of the present disclosure, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not essential features of those embodiments, unless noted as such.

It will be further understood that various modifications, alternatives, and variations in the details, materials, and arrangements of the parts which have been described and illustrated in order to explain the nature of described embodiments may be made by those skilled in the art without departing from the scope. Accordingly, the following claims embrace all such alternatives, modifications, and variations that fall within the terms of the claims.

Clause 1: A method for resource selection and packet transmission in sidelink communications, the method comprising:

collecting at least one of sidelink sensing information or resource reservation information of a first sidelink communication;

collecting at least one of sidelink sensing information or resource reservation information of a second sidelink communication;

determining one or more candidate resources based on at least one of: the sidelink sensing information of the first sidelink communication, the resource reservation information of the first sidelink communication, the sidelink sensing information of the second sidelink communication, or the resource reservation information of the second sidelink communication;

selecting one or more resources among the one or more candidate resources;

determining whether a resource reselection is needed; and transmitting, using the one or more selected resources, one or more packets in response to a determination that the resource reselection is not needed.

Clause 2: The method of clause 1, wherein collecting the sidelink sensing information of the first sidelink communication comprises: measuring one or more sidelink reference signal received powers (SL-RSRPs) of the first sidelink communication, corresponding to the resource reservation information of the first sidelink communication, and wherein collecting the sidelink sensing information of the second sidelink communication comprises: measuring one or more SL-RSRPs of the second sidelink communication, corresponding to the resource reservation information of the second sidelink communication.

Clause 3: The method of clause 1, further comprising:
in response to a determination that the resource reselection is needed, iterating at least a portion of the method including at least one of: the collecting at least one of the sidelink sensing information or the resource reservation information of the first sidelink communication, or the collecting at least one of the sidelink sensing information or the resource reservation information of the second sidelink communication.

Clause 4: The method of clause 1, further comprising:
performing a channel sensing.

Clause 5: The method of clause 1, further comprising:
checking resource availability at least one time after the resource selection and before the transmission based on a re-evaluation of the one or more selected resources or a pre-emption of the one or more selected resources.

Clause 6: The method of clause 1, wherein the first sidelink communication is a new radio (NR) sidelink communication and the second sidelink communication is a long-term evolution (LTE) sidelink communication.

Clause 7: The method of clause 1, wherein the one or more packets are transmitted based on a semi-persistent scheduling or a one-shot transmission.

Clause 8: The method of clause 1, wherein determining the one or more candidate resources further comprises:
determining a first set of candidate resources based on at least one of the sidelink sensing information of the second sidelink communication, or the resource reservation information of the second sidelink communication.

Clause 9: The method of clause 1, wherein determining the one or more candidate resources further comprises:
excluding one or more resources from a set of resources based on at least one of: one or more resource reservation information of the first sidelink communication, resource reservation information of the second sidelink communication, one or more SL-RSRPs of the first sidelink communication, one or more SL-RSRPs of the second sidelink communication, one or more sidelink received signal strength indicators (S-RSSIs) of the first sidelink communication, one or more S-RSSIs of the second sidelink communication, one or more priorities of the first sidelink communication, or one or more priorities of the second sidelink communication.

Clause 10: The method of clause 9, further comprising: configuring or preconfiguring one or more initial SL-RSRP thresholds for one or more combinations of one or more first sidelink priorities and one or more second sidelink priorities.

Clause 11: The method of clause 1, wherein determining the one or more candidate resources further comprises: excluding one or more resources from a set of resources based on at least one of: one or more resource reservations of the first sidelink communication having one or more corresponding SL-RSRPs above a first threshold or one or more resource reservations of the second sidelink communication having one or more corresponding SL-RSRPs above a second threshold.

Clause 12: The method of clause 11, further comprising: configuring or preconfiguring one or more SL-RSRP thresholds for one or more combinations of one or more first sidelink priorities and one or more second sidelink priorities.

Clause 13: The method of clause 8, wherein determining the first set of candidate resources further comprises: excluding one or more resources from a set of resources based on one or more S-RSSIs of the second sidelink communication.

Clause 14: The method of clause 13, further comprising: configuring or preconfiguring one or more S-RSSI thresholds for one or more first sidelink priorities.

Clause 15: The method of clause 8, further comprising: determining a second set of candidate resources by applying a resource exclusion to the first set of candidate resources based on at least one of: subframe or slot.

Clause 16: The method of clause 15, further comprising: determining a third set of candidate resources based on at least one of the sidelink sensing information of the first sidelink communication, or the resource reservation information of the first sidelink communication.

Clause 17: The method of clause 16, further comprising: identifying an intersection of the second set and the third set as the candidate resources.

Clause 18: The method of clause 1, wherein determining the candidate resources further comprises: identifying the candidate resources by jointly taking into account at least one of: the sidelink sensing information of the first sidelink communication or the resource reservation information of the first sidelink communication, and at least one of the sidelink sensing information of the second sidelink communication or the resource reservation information of the second sidelink communication.

Clause 19: The method of clause 1, wherein selecting the one or more resources among the one or more candidate resources further comprises: selecting, from the one or more candidate resources, one or more resources within at least a first slot of two or more slots of the first sidelink communication that overlap with one or more subframe of the second sidelink communication.

Clause 20: The method of clause 19, wherein the first sidelink communication is an NR sidelink communication that uses a sub-carrier spacing of 15 kHz, 30 kHz, or 60 kHz, and the second sidelink communication is an LTE sidelink communication that uses a sub-carrier spacing of 15 kHz, and the method further comprises: selecting, in a Medium Access Control (MAC) layer, one or more resources within a first slot of the two or more slots of the NR sidelink communication that overlaps with one or more subframes of the LTE sidelink communication, from the one or more candidate resources of the NR sidelink communication.

Clause 21: The method of clause 1, wherein determining the one or more candidate resources further comprises: excluding, in a physical layer and from a set of resources, one or more subframes of the first sidelink communication that overlap with one or more subframes of the second sidelink communication.

Clause 22: The method of clause 21, wherein the first sidelink communication is an NR sidelink communication that uses a sub-carrier spacing of 15 kHz, 30 kHz, or 60 kHz, and the second sidelink communication is an LTE sidelink communication that uses a sub-carrier spacing of 15 KHz.

Clause 23: The method of clause 1, wherein determining the one or more candidate resources further comprises: excluding, in a physical layer and from a set of resources, one or more slots of the first sidelink communication that overlap with one or more subframes of the second sidelink communication, wherein the one or more slots exclude a first slot of the first sidelink communication.

Clause 24: The method of clause 23, wherein the first sidelink communication is an NR sidelink communication that uses a sub-carrier spacing of 15 kHz, 30 kHz, or 60 kHz, and the second sidelink communication is an LTE sidelink communication that uses a sub-carrier spacing of 15 KHz.

Clause 25: The method of clause 1, wherein the method is performed by a first user equipment (UE), and the method further comprises: receiving, from one or more second UEs, at least one of: the sidelink sensing information of the first sidelink communication, the resource reservation information of the first sidelink communication, the sidelink sensing information of the second sidelink communication, or the resource reservation information of the second sidelink communication.

Clause 26: The method of clause 1, wherein the method is performed by a first UE, and the method further comprises: receiving, from one or more second UEs, at least one of: the resource reservation information of the first sidelink communication, the resource reservation information of the second sidelink communication, one or more SL-RSRPs of the first sidelink communication, one or more SL-RSRPs of the second sidelink communication, one or more S-RSSIs of the first sidelink communication, one or more S-RSSIs of the second sidelink communication, one or more priorities of the first sidelink communication, or one or more priorities of the second sidelink communication.

Clause 27: The method of clause 26, further comprises: receiving, from the one or more second UEs, at least one of: position information of the one or more second UEs, one or more physical coordinates of the one or more second UEs, an identity of a cell where the one or more second UEs are camped on, one or more identities of one or more devices from which the one or more second UEs receive sidelink signals, or a zone identification identifying where the one or more second UEs are located.

Clause 28: The method of clause 26, wherein determining the one or more candidate resources further comprises:

taking into account information shared from the one or more second UEs if the one or more second UE are in proximity.

Clause 29: The method of clause 28, wherein the proximity of the one or more second UEs is determined based on a distance threshold.

Clause 30: The method of clause 25, further comprises:

requesting the one or more second UEs to share at least one of: the sidelink sensing information of the first sidelink communication, the resource reservation information of the first sidelink communication, the sidelink sensing information of the second sidelink communication, or the resource reservation information of the second sidelink communication.

Clause 31: The method of clause 30, wherein requesting the one or more second UEs to share is based on at least one of: a physical-layer signaling, a MAC-layer signaling, a Radio Resource Control (RRC) layer signaling, or a higher-layer signaling.

Clause 32: The method of clause 1, wherein the method is performed by a UE, and the method further comprises:

indicating a type of the UE or one or more sidelink communication protocols that the UE supports.

Clause 33: The method of clause 32, wherein indicating the type of the UE or the one or more sidelink communication protocols that the UE supports is based on at least one of: a physical-layer signaling, a MAC-layer signaling, an RRC layer signaling, or a higher-layer signaling.

Clause 34: A user equipment (UE) for sidelink communications, the UE comprising:

a memory storing an instruction; and a processor configured to execute the instruction stored in the memory to:

collect at least one of sidelink sensing information or resource reservation information of a first sidelink communication;

collect at least one of sidelink sensing information or resource reservation information of a second sidelink communication;

determine one or more candidate resources based on at least one of: the sidelink sensing information of the first sidelink communication, the resource reservation information of the first sidelink communication, the sidelink sensing information of the second sidelink communication, or the resource reservation information of the second sidelink communication;

select one or more resources among the one or more candidate resources;

determine whether a resource reselection is needed; and transmit a packet to a destination in response to a determination that the resource reselection is not needed.

Clause 35: The UE of clause 34, wherein in collecting the sidelink sensing information of the first sidelink communication, the processor is further configured to execute the instruction to: measure one or more sidelink reference signal received powers (SL-RSRPs) of the first sidelink communication, corresponding to the resource reservation information of the first sidelink communication, and wherein in collecting the sidelink sensing information of the second sidelink communication, the processor is further configured to execute the instruction to: measure one or more SL-RSRPs of the second sidelink communication, corresponding to the resource reservation information of the second sidelink communication.

Clause 36: The UE of clause 34, wherein the processor is further configured to execute the instruction to:

in response to a determination that the resource reselection is needed, iterate at least a portion of a method including at least one of: the collecting at least one of the sidelink sensing information or the resource reservation information of the first sidelink communication, or the collecting at least one of the sidelink sensing information or the resource reservation information of the second sidelink communication.

Clause 37: The UE of clause 34, wherein the processor is further configured to execute the instruction to:

perform a channel sensing.

Clause 38: The UE of clause 34, wherein the processor is further configured to execute the instruction to:

check resource availability at least one time after the resource selection and before the transmission based on a re-evaluation of the one or more selected resources or a pre-emption of the one or more selected resources.

Clause 39: The UE of clause 34, wherein the first sidelink communication is a new radio (NR) sidelink communication and the second sidelink communication is a long-term evolution (LTE) sidelink communication.

Clause 40: The UE of clause 34, wherein the one or more packets are transmitted based on a semi-persistent scheduling or a one-shot transmission.

Clause 41: The UE of clause 34, wherein in determining the one or more candidate resources, the processor is further configured to execute the instruction to:

determine a first set of candidate resources based on at least one of the sidelink sensing information of the second sidelink communication, or the resource reservation information of the second sidelink communication.

Clause 42: The UE of clause 34, wherein in determining the one or more candidate resources, the processor is further configured to execute the instruction to:

exclude one or more resources from a set of resources based on at least one of: one or more resource reservation information of the first sidelink communication, resource reservation information of the second sidelink communication, one or more SL-RSRPs of the first sidelink communication, one or more SL-RSRPs of the second sidelink communication, one or more sidelink received signal strength indicators (S-RSSIs) of the first sidelink communication, one or more S-RSSIs of the second sidelink communication, one or more priorities of the first sidelink communication, or one or more priorities of the second sidelink communication.

Clause 43: The UE of clause 42, wherein the processor is further configured to execute the instruction to:

configure or preconfigure one or more initial SL-RSRP thresholds for one or more combinations of one or more first sidelink priorities and one or more second sidelink priorities.

Clause 44: The UE of clause 34, wherein in determining the one or more candidate resources, the processor is further configured to execute the instruction to:

exclude one or more resources from a set of resources based on at least one of: one or more resource reservations of the first sidelink communication having one or more corresponding SL-RSRPs above a first threshold or one or more resource reservations of the second sidelink communication having one or more corresponding SL-RSRPs above a second threshold.

Clause 45: The UE of clause 44, wherein the processor is further configured to execute the instruction to:

configure or preconfigure one or more SL-RSRP thresholds for one or more combinations of one or more first sidelink priorities and one or more second sidelink priorities.

Clause 46: The UE of clause 41, wherein in determining the first set of candidate resources, the processor is further configured to execute the instruction to:

exclude one or more resources from a set of resources based on one or more S-RSSIs of the second sidelink communication.

Clause 47: The UE of clause 46, wherein the processor is further configured to execute the instruction to:

configure or preconfigure one or more S-RSSI thresholds for one or more first sidelink priorities.

Clause 48: The UE of clause 41, wherein the processor is further configured to execute the instruction to:

determine a second set of candidate resources by applying a resource exclusion to the first set of candidate resources based on at least one of: subframe or slot.

Clause 49: The UE of clause 48, wherein the processor is further configured to execute the instruction to:

determine a third set of candidate resources based on at least one of the sidelink sensing information of the first sidelink communication, or the resource reservation information of the first sidelink communication.

Clause 50: The UE of clause 49, wherein the processor is further configured to execute the instruction to:

identify an intersection of the second set and the third set as the candidate resources.

Clause 51: The UE of clause 34, wherein in determining the candidate resources, the processor is further configured to execute the instruction to:

identify the candidate resources by jointly taking into account at least one of: the sidelink sensing information of the first sidelink communication or the resource reservation information of the first sidelink communication, and at least one of the sidelink sensing information of the second sidelink communication or the resource reservation information of the second sidelink communication.

Clause 52: The UE of clause 34, wherein in selecting the one or more resources among the one or more candidate resources, the processor is further configured to execute the instruction to:

select, from the one or more candidate resources, one or more resources within at least a first slot of two or more slots of the first sidelink communication that overlap with one or more subframe of the second sidelink communication.

Clause 53: The UE of clause 52, wherein the first sidelink communication is an NR sidelink communication that uses a sub-carrier spacing of 15 kHz, 30 kHz, or 60 kHz, and the second sidelink communication is an LTE sidelink communication that uses a sub-carrier spacing of 15 kHz, and the processor is further configured to execute the instruction to:

select, in a Medium Access Control (MAC) layer, one or more resources within a first slot of the two or more slots of the NR sidelink communication that overlaps with one or more subframes of the LTE sidelink communication, from the one or more candidate resources of the NR sidelink communication.

Clause 54: The UE of clause 34, wherein in determining the one or more candidate resources, the processor is further configured to execute the instruction to:

exclude, in a physical layer and from a set of resources, one or more subframes of the first sidelink communication that overlap with one or more subframes of the second sidelink communication.

Clause 55: The UE of clause 54, wherein the first sidelink communication is an NR sidelink communication that uses a sub-carrier spacing of 15 kHz, 30 kHz, or 60 kHz, and the second sidelink communication is an LTE sidelink communication that uses a sub-carrier spacing of 15 kHz.

Clause 56: The UE of clause 34, wherein in determining the one or more candidate resources, the processor is further configured to execute the instruction to:

exclude, in a physical layer and from a set of resources, one or more slots of the first sidelink communication that overlap with one or more subframes of the second sidelink communication, wherein the one or more slots exclude the first slot of the first sidelink communication.

Clause 57: The UE of clause 56, wherein the first sidelink communication is an NR sidelink communication that uses a sub-carrier spacing of 15 kHz, 30 kHz, or 60 kHz, and the second sidelink communication is an LTE sidelink communication that uses a sub-carrier spacing of 15 KHz.

Clause 58: The UE of clause 34, wherein the UE is a first UE, and the processor is further configured to execute the instruction to:

receive, from one or more second UEs, at least one of: the sidelink sensing information of the first sidelink communication, the resource reservation information of the first sidelink communication, the sidelink sensing information of the second sidelink communication, or the resource reservation information of the second sidelink communication.

Clause 59: The UE of clause 34, wherein the UE is a first UE, and the processor is further configured to execute the instruction to:

receive, from one or more second UEs, at least one of: the resource reservation information of the first sidelink communication, the resource reservation information of the second sidelink communication, one or more SL-RSRPs of the first sidelink communication, one or more SL-RSRPs of the second sidelink communication, one or more S-RSSIs of the first sidelink communication, one or more S-RSSIs of the second sidelink communication, one or more priorities of the first sidelink communication, or one or more priorities of the second sidelink communication.

Clause 60: The UE of clause 59, wherein the processor is further configured to execute the instruction to:

receive, from the one or more second UEs, at least one of: position information of the one or more second UEs, one or more physical coordinates of the one or more second UEs, an identity of a cell where the one or more second UEs are camped on, one or more identities of one or more devices from which the one or more second UEs receive sidelink signals, or a zone identification identifying where the one or more second UEs are located.

Clause 61: The UE of clause 59, wherein in determining the one or more candidate resources, the processor is further configured to execute the instruction to:

take into account information shared from the one or more second UEs if the one or more second UE are in proximity.

Clause 62: The UE of clause 61, wherein the proximity of the one or more second UEs is determined based on a distance threshold.

Clause 63: The UE of clause 58, wherein the processor is further configured to execute the instruction to:

request the one or more second UEs to share at least one of: the sidelink sensing information of the first sidelink communication, the resource reservation information of the first sidelink communication, the sidelink sensing information of the second sidelink communication, or the resource reservation information of the second sidelink communication.

Clause 64: The UE of clause 63, wherein requesting the one or more second UEs is based on at least one of: a physical-layer signaling, a MAC-layer signaling, a Radio Resource Control (RRC) layer signaling, or a higher-layer signaling.

Clause 65: The UE of clause 34, wherein the processor is further configured to execute the instruction to:

indicate a type of the UE or one or more sidelink communication protocols that the UE supports.

Clause 66: The UE of clause 65, wherein indicating the type of the UE or the one or more sidelink communication protocols that the UE supports is based on at least one of: a physical-layer signaling, a MAC-layer signaling, an RRC layer signaling, or a higher-layer signaling.

Clause 67: A non-transitory computer-readable medium storing instructions that are executable by one or more processors of a user equipment (UE) for communication, to perform a method, the method comprising:

collecting at least one of sidelink sensing information or resource reservation information of a first sidelink communication;

collecting at least one of sidelink sensing information or resource reservation information of a second sidelink communication;

determining one or more candidate resources based on at least one of: the sidelink sensing information of the first sidelink communication, the resource reservation information of the first sidelink communication, the sidelink sensing information of the second sidelink communication, or the resource reservation information of the second sidelink communication;

selecting one or more resources among the one or more candidate resources;

determining whether a resource reselection is needed; and transmitting a packet to a destination in response to a determination that the resource reselection is not needed.

The invention claimed is:

1. A method for resource selection and packet transmission in sidelink communications, the method comprising:

collecting at least one of sidelink sensing information or resource reservation information of a first sidelink communication;

collecting at least one of sidelink sensing information or resource reservation information of a second sidelink communication, wherein subcarrier spacing (SCS) used in the first sidelink communication is greater than SCS used in the second sidelink communication;

determining one or more candidate resources based on at least one of: the sidelink sensing information of the first sidelink communication, the resource reservation information of the first sidelink communication, the sidelink sensing information of the second sidelink communication, or the resource reservation information of the second sidelink communication;

selecting one or more resources among the one or more candidate resources; and transmitting, using the one or more selected resources, one or more packets, wherein determining the one or more candidate resources further comprises:

excluding one or more resources from a set of resources based on: one or more resource reservations of the first sidelink communication having one or more corresponding sidelink reference signal received powers (SL-RSRPs) above a first threshold and one or more resource reservations of the second sidelink communication having one or more corresponding SL-RSRPs above a second threshold different from the first threshold.

2. The method of claim 1, wherein collecting the sidelink sensing information of the first sidelink communication comprises: measuring one or more SL-RSRPs of the first sidelink communication, corresponding to the resource reservation information of the first sidelink communication, and wherein collecting the sidelink sensing information of the second sidelink communication comprises: measuring one or more SL-RSRPs of the second sidelink communication, corresponding to the resource reservation information of the second sidelink communication.

3. The method of claim 1, further comprising:

determining whether a resource reselection is needed; and in response to a determination that the resource reselection is needed, iterating at least a portion of the method including at least one of: the collecting at least one of the sidelink sensing information or the resource reservation information of the first sidelink communication, or the collecting at least one of the sidelink sensing information or the resource reservation information of the second sidelink communication.

4. The method of claim 1, further comprising:

performing a channel sensing.

5. The method of claim 1, further comprising:

checking resource availability at least one time after the resource selection and before the transmission based on a re-evaluation of the one or more selected resources or a pre-emption of the one or more selected resources.

6. The method of claim 1, wherein the first sidelink communication is a new radio (NR) sidelink communication and the second sidelink communication is a long-term evolution (LTE) sidelink communication.

7. The method of claim 1, wherein the one or more packets are transmitted based on a semi-persistent scheduling or a one-shot transmission.

8. The method of claim 1, wherein determining the one or more candidate resources further comprises:

determining a first set of candidate resources based on at least one of the sidelink sensing information of the second sidelink communication, or the resource reservation information of the second sidelink communication.

9. The method of claim 8, further comprising:

determining a second set of candidate resources by applying a resource exclusion to the first set of candidate resources based on at least one of: subframe or slot.

10. The method of claim 1, wherein the excluding one or more resources from the set of resources is further based on at least one of: one or more sidelink received signal strength indicators (S-RSSIs) of the first sidelink communication, one or more S-RSSIs of the second sidelink communication, one or more priorities of the first sidelink communication, or one or more priorities of the second sidelink communication.

11. The method of claim 10, further comprising:

configuring or preconfiguring the second threshold for one or more combinations of one or more first sidelink priorities and one or more second sidelink priorities.

12. The method of claim 1, further comprising:

configuring or preconfiguring one or more SL-RSRP thresholds, as the second threshold, for one or more combinations of one or more first sidelink priorities and one or more second sidelink priorities.

13. The method of claim 1, wherein determining the candidate resources further comprises:

identifying the candidate resources by jointly taking into account at least one of:

the sidelink sensing information of the first sidelink communication or the resource reservation information of the first sidelink communication, and at least one of the sidelink sensing information of the second sidelink communication or the resource reservation information of the second sidelink communication.

14. The method of claim 1, wherein the first sidelink communication is an NR sidelink communication, the SCS used in the first sidelink communication is 15 kHz, 30 kHz, or 60 kHz, the second sidelink communication is an LTE sidelink communication, the SCS used in the second sidelink communication is 15 kHz, and the method further comprises:

selecting, in a Medium Access Control (MAC) layer, one or more resources within the first slot of the two or more slots of the NR sidelink communication that overlaps with one or more subframes of the LTE sidelink communication, from the one or more candidate resources of the NR sidelink communication.

15. The method of claim 1, wherein determining the one or more candidate resources further comprises:

excluding, in a physical layer and from a set of resources, one or more slots of the first sidelink communication that overlap with one or more subframes of the second sidelink communication except for the first slot of the first sidelink communication.

16. The method of claim 1, wherein the method is performed by a first apparatus, and the method further comprises:

receiving, from one or more second apparatuses, at least one of: the sidelink sensing information of the first sidelink communication, the resource reservation information of the first sidelink communication, the sidelink sensing information of the second sidelink communication, or the resource reservation information of the second sidelink communication.

17. The method of claim 1, wherein the method is performed by a first apparatus, and the method further comprises:

receiving, from one or more second apparatuses, at least one of: the resource reservation information of the first sidelink communication, the resource reservation information of the second sidelink communication, one or more SL-RSRPs of the first sidelink communication, one or more SL-RSRPs of the second sidelink communication, one or more S-RSSIs of the first sidelink communication, one or more S-RSSIs of the second sidelink communication, one or more priorities of the first sidelink communication, or one or more priorities of the second sidelink communication.

18. A user equipment (UE) for sidelink communications, the UE comprising:

a memory storing an instruction; and a processor configured to execute the instruction stored in the memory to:

collect at least one of sidelink sensing information or resource reservation information of a first sidelink communication;

collect at least one of sidelink sensing information or resource reservation information of a second sidelink communication, wherein subcarrier spacing (SCS) used in the first sidelink communication is greater than SCS used in the second sidelink communication;

determine one or more candidate resources based on at least one of: the sidelink sensing information of the first sidelink communication, the resource reservation information of the first sidelink communication, the sidelink sensing information of the second sidelink communication, or the resource reservation information of the second sidelink communication;

select one or more resources among the one or more candidate resources; and transmit, using the one or more selected resources, one or more packets, wherein determining the one or more candidate resources further comprises:

excluding one or more resources from a set of resources based on: one or more resource reservations of the first sidelink communication having one or more corresponding sidelink reference signal received powers (SL-RSRPs) above a first threshold and one or more resource reservations of the second sidelink communication having one or more corresponding SL-RSRPs above a second threshold different from the first threshold.

19. A non-transitory computer-readable medium storing instructions that are executable by one or more processors of a user equipment (UE), to perform a method for resource selection and packet transmission in sidelink communications, the method comprising:

collecting at least one of sidelink sensing information or resource reservation information of a first sidelink communication;

collecting at least one of sidelink sensing information or resource reservation information of a second sidelink communication, wherein subcarrier spacing (SCS) used in the first sidelink communication is greater than SCS used in the second sidelink communication;

determining one or more candidate resources based on at least one of: the sidelink sensing information of the first sidelink communication, the resource reservation information of the first sidelink communication, the sidelink sensing information of the second sidelink communication, or the resource reservation information of the second sidelink communication;

selecting one or more resources among the one or more candidate resources; and transmitting, using the one or more selected resources, one or more packets, wherein determining the one or more candidate resources further comprises:

excluding one or more resources from a set of resources based on: one or more resource reservations of the first sidelink communication having one or more corresponding sidelink reference signal received powers (SL-RSRPs) above a first threshold and one or more resource reservations of the second sidelink communication having one or more corresponding SL-RSRPs above a second threshold different from the first threshold.

* * * * *